(12) United States Patent
Kodate et al.

(10) Patent No.: US 7,221,352 B2
(45) Date of Patent: May 22, 2007

(54) DRIVING METHOD FOR IMPROVING DISPLAY UNIFORMITY IN MULTIPLEXED PIXEL

(75) Inventors: Manabu Kodate, Yokohama (JP); Kai Schleupen, Yorktown Heights, NY (US); Eisuke Kanzaki, Fujisawa (JP)

(73) Assignee: Lenovo Singapore Pte. Ltd, Singapore (SG)

(*) Notice: Subject to any disclaimer, the term of this patent is extended or adjusted under 35 U.S.C. 154(b) by 221 days.

(21) Appl. No.: 10/892,785

(22) Filed: Jul. 15, 2004

(65) Prior Publication Data
US 2004/0263760 A1    Dec. 30, 2004

(30) Foreign Application Priority Data
Jan. 17, 2002 (JP) .............................. 2002-009143

(51) Int. Cl.
G09G 3/36  (2006.01)
G09G 3/30  (2006.01)
G02F 1/136 (2006.01)

(52) U.S. Cl. .............................. 345/92; 345/76; 349/42
(58) Field of Classification Search .......... 345/87–104; 349/42–48
See application file for complete search history.

(56) References Cited

U.S. PATENT DOCUMENTS

| | | | |
|---|---|---|---|
| 5,712,652 A * | 1/1998 | Sato et al. ...................... 345/90 |
| 5,805,248 A * | 9/1998 | Sakamoto et al. ............. 349/48 |
| 6,028,577 A * | 2/2000 | Sakamoto ...................... 345/92 |
| 6,476,787 B1 * | 11/2002 | Libsch et al. ................. 345/92 |
| 6,486,930 B1 * | 11/2002 | Kwon ........................... 349/48 |
| 6,512,504 B1 * | 1/2003 | Yamauchi et al. ............. 345/87 |
| 6,559,433 B1 * | 5/2003 | Ozawa ...................... 250/208.1 |
| 6,583,777 B2 * | 6/2003 | Hebiguchi et al. ............ 345/92 |
| 6,593,905 B1 * | 7/2003 | Lay ............................... 345/92 |
| 6,933,910 B2 * | 8/2005 | Kodate et al. ................ 345/55 |

* cited by examiner

Primary Examiner—Richard Hjerpe
Assistant Examiner—M. Fatahiyar
(74) Attorney, Agent, or Firm—Margaret A. Pepper; Carlos Munoz-Bustamante

(57) ABSTRACT

Disclosed is an image display device to secure uniformity of a screen without luminance unevenness by reducing the number of signal lines and enhancing accuracy in voltages to be applied to respective pixels. In an interval after a scan line Gn+2 is set to selection potential until the scan line Gn+2 is set to non-selection potential, a first display signal having first electric potential to be given to a pixel electrode A is supplied to a signal line, whereby the pixel electrode A and a pixel electrode B are provided with the first electric potential. In addition, after the scan line Gn+2 is set to the non-selection potential, a second display signal having second electric potential to be given to the pixel electrode B is supplied to the signal line, whereby the pixel electrode B is provided with the second electric potential. In this event, a variation of compensative potential for offsetting a difference between an electric potential variation corresponding to parasitic capacitance between the pixel electrode A and scan lines Gn+1 and Gn+2, and an electric potential variation corresponding to parasitic capacitance between the pixel electrode B and the scan line Gn+1, is given to the scan lines Gn+1 and Gn+2 for compensation.

25 Claims, 19 Drawing Sheets

(a)

(b)

"PRIOR ART"

"PRIOR ART"

US 7,221,352 B2

DRIVING METHOD FOR IMPROVING DISPLAY UNIFORMITY IN MULTIPLEXED PIXEL

BACKGROUND OF THE INVENTION

This invention relates to display devices and scan line driver circuits. Specifically, the invention relates to a liquid crystal display device including multiplex pixels or to a scan line driver circuit for use in the liquid crystal display device, for example.

Recently, enhancement in higher resolution of displays, which has been conventionally slow-paced in CRT displays, is showing dramatic improvements in line with introduction of new technologies including liquid crystal. Particularly, liquid crystal display devices can achieve higher definition relatively easily as compared to CRT displays by means of incorporating micro fabrication.

An active-matrix-type liquid crystal display device using thin-film transistors (TFTs) as switching elements is known as a typical liquid crystal display device. The active-matrix-type liquid crystal display device includes a TFT array substrate, in which scan lines and signal lines are arranged in a matrix and thin-film transistors are arranged on intersection points thereof. A liquid crystal material is filled in a gap between the TFT array substrate and a counter substrate disposed at a given distance from the TFT array substrate. Further, the thin-film transistors control voltages to be applied to the liquid crystal material, thus performing display by use of electro-optic effects of the liquid crystal.

FIG. 21 is an equivalent circuit diagram of pixels formed on the TFT array substrate. In FIG. 21, signal lines 30 and scan lines 40 are arranged in a matrix, and an area surrounded by the signal lines 30 and the scan lines 40 constitutes a single pixel. The single pixel includes a pixel electrode 20 and a TFT 10 connected thereto. When the scan line 40 is set to selection potential, the TFT is turned on. Display potential (a display signal) is given by the signal line 30 to the pixel electrode 20. The display potential controls an intensity of light which passes through liquid crystal.

In general, the following problems have been proposed in connection with an increase in the number of pixels associated with enhancement in higher definition of an active-matrix-type liquid crystal display device. Specifically, numbers of signal lines and scan lines are substantially increased along with an increase in the number of pixels, thus incurring an increase in the number of driver ICs and a cost rise. Moreover, an electrode pitch for connection between a driver IC and an array substrate is narrowed, whereby connection becomes more difficult and a process yield upon connection is deteriorated.

In order to solve these problems simultaneously, disclosed are proposals for imparting electric potential from one signal line to two adjacent pixels by time-division so that the number of necessary data driver ICs are reduced and pitches between connection terminals are widened. Such proposals include Japanese Unexamined Patent Publications No. 6(1994)-148680, No. 11(1999)-2837, No. 5(1993)-265045, No. 5(1993)-188395 and No. 5(1993)-303114, for example.

FIG. 22 shows one of the proposals disclosed in Japanese Unexamined Patent Publication No. 5(1993)-265045. The proposal includes a structure in which two pixels are connected to one signal line via TFTs P1 to P3. A pixel electrode (i, k) and a pixel electrode (i, k+1) are included in the same row. That is, display potential is given to these two pixel electrodes in one scanning cycle. The pixel electrode (i, k) is connected to a signal line 6-$j$ via two TFTs P1 and P2. Meanwhile, the pixel electrode (i, k+1) is connected to the signal line 6-$j$ via one TFT P3.

Operations of these two pixels will be now described. In a first period, a scan line 8-$i$ and a scan line 8-$i$+1 are set to the selection potential. In this way, the TFTs P1, P2 and P3 are turned on. First display potential given to the signal line 6-$j$ is supplied to the pixel electrode (i, k) and the pixel electrode (i, k+1). Display potential of the pixel electrode (i, k) is thereby determined. In a second period, the selection potential is given to the scan line 8-$i$ and non-selection potential is given to the scan line 8-$i$+1. Second display potential given to the signal line 6-$j$ is supplied to the pixel electrode (i, k+1). Display potential of the pixel electrode (i, k+1) is thereby determined.

Accordingly, the number of the signal lines can be reduced by half as many as the number required in a conventional mode. Therefore, the number of outputs of data drivers can be also reduced by half.

However, in the conventional inventions concerning multiplex-pixel LCDs, an influence by parasitic capacitance between each pixel electrode and a gate line (or a gate electrode) is not considered. As it will be described later in the preferred embodiments of this invention, a plurality of pixels (multiplex pixels) provided with display potential from one signal line in one scanning period show different variations of pixel potential because of the parasitic capacitance. Such a difference is incurred by a difference in pixel structures among the respective pixels, or alternatively, by a difference in orders of selection (orders to provide the display potential).

The difference in the variations of pixel potential owing to the parasitic capacitance deteriorates accuracy in voltages to be applied to the pixels. Particularly, the difference causes significant luminance unevenness among the pixels in the event of halftone display.

SUMMARY OF THE INVENTION

This invention has been made in consideration of the foregoing problem. An objective of this invention is to provide an image display device capable of reducing the number of signal lines as well as the number of data drivers thereof, and capable of securing uniformity of a screen by enhancing accuracy in voltages to be applied to respective pixels and thereby reducing luminance unevenness.

The following constitutions are disclosed as the invention as claimed in the application concerned. The following constitution can reduce the difference in the variations of pixel potential among the multiplex pixels attributable to pixel-selecting scan lines, pixel electrodes and parasitic capacitance, thereby relieving deterioration of image display quality.

In order to facilitate understanding of the invention, constituents of the invention are accompanied with items as disclosed in the detailed description of the invention. However, it should be understood that those items are just examples of the respective constituents, and any of the constituents may be accompanied with only one item therein, notwithstanding that a plurality of items are applicable thereto.

A first aspect of the invention is a display device including a signal line for transmitting display signals for image display to a plurality of pixel electrodes, and first (such as A1 in FIG. 2) and second (such as B1 in FIG. 2) pixel electrodes to which the display signals are severally and serially given by the signal line within one scanning cycle. The first pixel electrode is connected to a first scan line group (such as Gn+1 and Gn+2 in FIG. 2), which includes one or a plurality of scan lines, via a first thin-film transistor (TFT) circuit (such as M1, M2 and a connective wiring portion thereof as shown in FIG. 2). The second pixel electrode is connected to a second scan line group (such as Gn+1 in FIG. 2), which includes one or a plurality of scan lines, via a second TFT circuit (such as M3 in FIG. 2) which is different from the first TFT circuit. When a first display signal is given to the first pixel electrode, a driver circuit outputs a first scan signal to the first scan line group. When a second display signal is given to the second pixel electrode, the driver circuit outputs a second scan signal to the second scan line group. The first scan signal and the second scan signal have electric potential values different from each other (refer to explanation regarding the after-mentioned embodiment 1, for example).

The one scanning cycle refers to one cycle in the case where a scan signal is cyclically shifted to subsequent stages of a scan line serially. Typically, the one scanning cycle corresponds to a period for signals to be inputted from an external device, such as a personal computer, for displaying pixels on one row. For example, a sum of selective periods for a pixel A and a pixel B in the embodiment 1 corresponds to the one scanning cycle. The TFT circuit refers to a circuit including a TFT. The TFT circuit may include one or more TFTs and may include other circuit elements in addition to the TFTs. The display signal refers to an image display signal specified for each of the pixel electrodes, which refers to a signal to be displayed by one pixel as one element of a display image. For example, when signals are inputted from a signal line to one pixel electrode multiple times in one scanning cycle (such as in the pixel electrode B1 in FIG. 2), the display signal refers to the signal inputted ultimately to the relevant pixel electrode.

A second aspect of the invention is the display device according to the first aspect, in which the first TFT circuit includes a first TFT (such as M1 in FIG. 2) of which a source/drain electrode is connected to the first pixel electrode, and a second TFT (such as M2 in FIG. 2) of which a source/drain electrode is connected to a gate electrode of the first TFT. Further, the second TFT circuit includes a third TFT (such as M3 in FIG. 2) of which a source/drain electrode is connected to the second pixel electrode and of which a gate electrode is connected to a second scan line (such as Gn+1 in FIG. 2) included in the second scan line group. When the first scan signal is outputted, first scan-line potential outputted to a first scan line (such as Gn+2 in FIG. 2) included in the first scan line group is given to the gate electrode of the first TFT via the second TFT. When the second scan signal is outputted, second scan-line potential is outputted to the second scan line. The outputted first scan-line potential has a greater value than the outputted second scan-line potential (refer to the explanation regarding the embodiment 1, for example).

A third aspect of the invention is the display device according to the second aspect, in which another source/drain electrode of the first TFT is connected to the signal line. Further, another source/drain electrode of the second TFT is connected to the first scan line. A gate electrode of the second TFT is connected to another scan line included in the first scan line group. Another source/drain electrode of the third TFT is connected to the signal line.

A fourth aspect of the invention is the display device according to the first aspect, in which the first TFT circuit (such as M11 and M12 in FIG. 18) includes a first TFT (such as M12 in FIG. 18) of which a source/drain electrode is connected to the first pixel electrode (such as A11 in FIG. 18) and of which a gate electrode is connected to a first scan line (such as Gn+2 in FIG. 18) included in the first scan line group. The second TFT circuit (such as M13 in FIG. 18) includes a second TFT (such as M13 in FIG. 18) of which a source/drain electrode is connected to the second pixel electrode (such as B11 in FIG. 18) and of which a gate electrode is connected to a second scan line (such as Gn+1 in FIG. 18) included in the second scan line group. A display signal is given to the second pixel electrode after a display signal is given to the first pixel electrode. Scan-line potential outputted to the first scan line has a smaller value than scan-line potential outputted to the second scan line (refer to explanation regarding the after-mentioned embodiment 4, for example).

A fifth aspect of the invention is the display device according to the first aspect, in which the first scan signal and the second scan signal have potential values different from each other, whereby a difference between a variation quantity of pixel potential possessed by the first pixel electrode and a variation quantity of pixel potential possessed by the second pixel electrode, the difference being attributable to variations of scan line potential, is reduced.

A sixth aspect of the invention is the display device according to the fourth aspect, in which the first TFT circuit includes a third TFT (such as M11 in FIG. 18). Source/drain electrodes of the third TFT are severally connected to the signal line and a source/drain electrode of the first TFT. A gate electrode of the third TFT is connected to a third scan line (such as Gn+1 in FIG. 18) included in the first scan line group. The second scan line and the third scan line collectively constitute a common scan line.

A seventh aspect of the invention is the display device according to the first aspect, in which the first TFT circuit includes first and second TFTs. The second TFT circuit includes a third TFT. The first scan line group consists of first and second scan lines. The second scan line group consists of the second scan line. A display signal is given to the first pixel electrode when the first and the second scan lines are selected. A display signal is given to the second pixel electrode when the first scan line is not selected and the second scan line is selected.

An eighth aspect of the invention is a scan line driver circuit used in an active-matrix type display device, in which a plurality of pixels including switching elements are disposed in a matrix and turning on and off of the switching elements of the plurality of pixels are controlled by a plurality of scan lines. Further, the driver circuit includes a plurality of scanning potential output terminals, and a selection potential supply circuit for supplying the selection potential severally to the plurality of the scanning potential output terminals. The selection potential supply circuit serially supplies first selection potential and second selection potential to at least one of the scanning potential output terminals.

The scan line driver circuits with the above-described constitution can output a variety of selection potential depending on multiplex pixels, thereby reducing a difference in variations of pixel potential between multiplex pixels attributable to pixel-selecting scan lines, pixel electrodes and parasitic capacitance.

A ninth aspect of the invention is the scan line driver circuit according to the eighth aspect, in which the selection potential supply circuit includes a first selection potential supply line for supplying electric potential corresponding to the first selection potential, a second selection potential supply line for supplying electric potential corresponding to the second selection potential, and a selection circuit for selecting any one of the first and the second selection potential supply lines and connecting the selected supply line to one of the scanning potential output terminals to constitute a circuit.

A tenth aspect of the invention is a display device (refer to explanation regarding the after-mentioned embodiment 2, for example) including a signal line for transmitting display signals for image display to a plurality of pixel electrodes, and first and second pixel electrodes to which the display signals are severally and serially given by the signal line within one scanning cycle. The first pixel electrode (such as A1 in FIG. 2) is connected to a first scan line group, which includes one or a plurality of scan lines, via a first TFT circuit (such as M1, M2 and a connective wiring portion thereof as shown in FIG. 2). The second pixel electrode (such as B1 in FIG. 2) is connected to a second scan line group, which includes one or a plurality of scan lines, via a second TFT circuit (such as M3 in FIG. 2) which is different from the first TFT circuit. When a first display signal is given to the first pixel electrode, a driver circuit outputs a first scan signal to the first scan line group. When a second display signal is given to the second pixel electrode, the driver circuit outputs a second scan signal to the second scan line group. Here, a size of at least one TFT included in the first TFT circuit is different from a size of at least one TFT included in the second TFT circuit.

Note that the selection potential of a scan line upon outputting the first scan signal and the selection potential of a scan line upon outputting the second scan signal may be equal to or different from each other. Such an aspect is also applicable to the following description unless otherwise expressly stated therein.

An eleventh aspect of the invention is the display device according to the tenth aspect, in which the first TFT circuit includes a first TFT (such as M1 in FIG. 2) of which a source/drain electrode is connected to the first pixel electrode, and a second TFT (such as M2 in FIG. 2) of which a source/drain electrode is connected to a gate electrode of the first TFT. The second TFT circuit includes a third TFT (such as M3 in FIG. 2) of which a source/drain electrode is connected to the second pixel electrode and of which a gate electrode is connected to a second scan line included in the second scan line group. When the first scan signal is outputted, first scan-line potential outputted to a first scan line included in the first scan line group is given to the gate electrode of the first TFT via the second TFT. When the second scan signal is outputted, second scan-line potential is outputted to the second scan line. The first TFT is greater than the third TFT.

A twelfth aspect of the invention is the display device according to the eleventh aspect, in which the second TFT is smaller than the third TFT.

A thirteenth aspect of the invention is the display device according to the tenth aspect, in which at least one TFT included in the first TFT circuit has a different size from a size of at least one TFT included in the second TFT circuit, whereby a difference between a variation quantity of pixel potential possessed by the first pixel electrode and a variation quantity of pixel potential possessed by the second pixel electrode, the difference being attributable to variations of scan line potential, is reduced.

A fourteenth aspect of the invention is the display device (refer to the explanation regarding the embodiment 4, for example) according to the tenth aspect. Here, the first TFT circuit includes a first TFT (such as M12 in FIG. 18). A source/drain electrode of the first TFT is connected to the first pixel electrode (such as A11 in FIG. 18), and a gate electrode thereof is connected to a first scan line (Gn+2) included in the first scan line group. The second TFT circuit includes a second TFT (such as M13 in FIG. 18). A source/drain electrode of the second TFT is connected to the second pixel electrode (such as B11 in FIG. 18), and a gate electrode thereof is connected to a second scan line (Gn+1) included in the second scan line group. The first scan line group and the second scan line group possess a scan line in common (such as Gn+1 in FIG. 18), and a display signal is given to the second pixel electrode after a display signal is given to the first pixel electrode. The second TFT is greater than the first TFT.

A fifteenth aspect of the invention is the display device (refer to the explanation regarding the embodiment 4, for example) according to the tenth aspect. Here, the first TFT circuit includes a first TFT (such as M12 in FIG. 18) connected to the first pixel electrode, and a second TFT (such as M11 in FIG. 18) connected to the first TFT. The second TFT circuit includes a third TFT (such as M13 in FIG. 18). The first scan line group consists of first (such as Gn+2 in FIG. 18) and second (such as Gn+1 in FIG. 18) scan lines. The second scan line group consists of the second scan line. A display signal is given to the first pixel electrode when the first and the second scan lines are selected. A display signal is given to the second pixel electrode when the first scan line is not selected and the second scan line is selected. The third TFT is greater than the first TFT.

A sixteenth aspect of the invention is a display device (refer to the explanation regarding the embodiment 4, for example) including a signal line for transmitting display signals for image display to a plurality of pixel electrodes, and first and second pixel electrodes to which the display signals are severally and serially given by the signal line within one scanning cycle. The first pixel electrode (such as B11 in FIG. 20) is connected to a first scan line group, which includes one or a plurality of scan lines, via a first TFT circuit (such as a TFT (M13) in FIG. 20). The second pixel electrode (such as A11 in FIG. 20) is connected to a second scan line group, which includes one or a plurality of scan lines, via a second TFT circuit (such as TFTs (M11 and M12) and a connective wiring portion thereof as shown in FIG. 20) which is different from the first TFT circuit. When a first display signal is given to the first pixel electrode, a driver circuit outputs a first scan signal to the first scan line group. When a second display signal is given to the second pixel electrode, the driver circuit outputs a second scan signal to the second scan line group. An additional capacitor (such as Ca in FIG. 20) is formed between the first pixel electrode and a scan line (such as Gn+1 in FIG. 20) included in the first scan line group, which is not formed between the second pixel electrode and scan lines included in the second scan line group.

A seventeenth aspect of the invention is the display device according to the sixteen aspect. Here, the first TFT circuit includes a first TFT (such as M1 in FIG. 2) of which a source/drain electrode is connected to the first pixel electrode (such as A1 in FIG. 2), and a second TFT (such as M2 in FIG. 2) of which a source/drain electrode is connected to a gate electrode of the first TFT. The second TFT circuit includes a third TFT (such as M3 in FIG. 2) of which a source/drain electrode is connected to the second pixel electrode (such as B1 in FIG. 2) and of which a gate electrode is connected to a second scan line (such as Gn+1 in FIG. 2) included in the second scan line group. When the first scan signal is outputted, first scan-line potential outputted to a first scan line (such as Gn+2 in FIG. 2) included in the first scan line group is given to the gate electrode of the first TFT via the second TFT. When the second scan signal is outputted, second scan-line potential is outputted to the second scan line (refer to the explanation regarding the embodiment 2, for example).

An eighteenth aspect of the invention is the display device according to the sixteenth aspect, in which the additional capacitor is formed between the first pixel electrode and the scan line included in the first scan line group, whereby a difference between a variation quantity of pixel potential possessed by the first pixel electrode and a variation quantity of pixel potential possessed by the second pixel electrode, the difference being attributable to variations of scan line potential, is reduced.

A nineteenth aspect of the invention is the display device according to the sixteenth aspect. Here, the first TFT circuit includes a first TFT (such as M13 in FIG. 18) of which a source/drain electrode is connected to the first pixel electrode and of which a gate electrode is connected to a first scan line included in the first scan line group. The second TFT circuit includes a second TFT (such as M11 in FIG. 18) of which a source/drain electrode is connected to the second pixel electrode and of which a gate electrode is connected to a second scan line included in the second scan line group. The first scan line group and the second scan line group possess a scan line in common (such as Gn+1 in FIG. 18), and a display signal is given to the first pixel electrode after a display signal is given to the second pixel electrode (refer to the explanation regarding the embodiment 4, for example).

A twentieth aspect of the invention is the display device according to the sixteenth, the seventeenth, the eighteenth or the nineteenth aspect. Here, the additional capacitor is formed in a manner that any of part of the first pixel electrode and a conductive portion connected to the first pixel electrode overlaps a scan line via an insulating layer.

A twenty-first aspect of the invention is a display device including a signal line for transmitting display signals for image display to a plurality of pixel electrodes, and first and second pixel electrodes to which the display signals are severally and serially given by the signal line within one scanning cycle. The first pixel electrode (such as A1 in FIG. 2) is connected to a first scan line group, which includes one or a plurality of scan lines, via a first TFT circuit. The second pixel electrode (such as B1 in FIG. 2) is connected to a second scan line group, which includes one or a plurality of scan lines, via a second TFT circuit which is different from the first TFT circuit. When a first display signal is given to the first pixel electrode, a driver circuit outputs a first scan signal to the first scan line group. When a second display signal is given to the second pixel electrode, the driver circuit outputs a second scan signal to the second scan line group. The first pixel electrode functions as an electrode of a first storage capacitor (such as Cs beside A1 in FIG. 2), and the second pixel electrode functions as an electrode of a second storage capacitor (such as Cs beside B1 in FIG. 2). The first storage capacitor is smaller than the second storage capacitor (refer to explanation regarding the after-mentioned embodiment 3, for example).

The selection potential of a scan line upon outputting the first scan signal and the selection potential of a scan line upon outputting the second scan signal may be equal to or different from each other.

A twenty-second aspect of the invention is a display device including a signal line for transmitting display signals for image display to a plurality of pixel electrodes, and first and second pixel electrodes to which the display signals are severally and serially given by the signal line within one scanning cycle. The first pixel electrode (such as A1 in FIG. 2) is connected to a first scan line group, which includes one or a plurality of scan lines, via a first TFT circuit. The second pixel electrode (such as B1 in FIG. 2) is connected to a second scan line group, which includes one or a plurality of scan lines, via a second TFT circuit which is different from the first TFT circuit. When a first display signal is given to the first pixel electrode, a driver circuit outputs a first scan signal to the first scan line group. When a second display signal is given to the second pixel electrode, the driver circuit outputs a second scan signal to the second scan line group. The first and the second pixel electrodes are formed between an n-th scan line (such as Gn in FIG. 2) and an n+1-th scan line (such as Gn+1 in FIG. 2). Storage capacitors (such as Cs in FIG. 2) are formed severally between the n-th scan line and the first and the second pixel electrodes. The first scan line group and the second scan line group are composed of scan lines subsequent to the n-th scan line (exclusive of the n-th scan line). A value of scan-line potential of the n-th scan line in a first period when display potential is given to the first pixel electrode is different from a value of scan-line potential of the n-th scan line in a second period when display potential is given to the second pixel electrode (refer to the explanation regarding the embodiment 3, for example).

A twenty-third aspect of the invention is the display device according to the twenty-second aspect. Here, the first TFT circuit includes a first TFT (such as M1 in FIG. 2) of which a source/drain electrode is connected to the first pixel electrode, and a second TFT (such as M2 in FIG. 2) of which a source/drain electrode is connected to a gate electrode of the first TFT. The second TFT circuit includes a third TFT (such as M3 in FIG. 2) of which a source/drain electrode is connected to the second pixel electrode and of which a gate electrode is connected to a second scan line included in the second scan line group. When the first scan signal is outputted, first scan-line potential outputted to a first scan line included in the first scan line group is given to the gate electrode of the first TFT via the second TFT. When the second scan signal is outputted, second scan-line potential is outputted to the second scan line. The scan-line potential of the n-th scan line in the first period is greater than the scan-line potential in the second period (refer to the explanation regarding the embodiment 3, for example).

A twenty-fourth aspect of the invention is the display device according to the twenty-third aspect. Here, another source/drain electrode of the first TFT is connected to the signal line. Another source/drain electrode of the second TFT is connected to the first scan line, and a gate electrode of the second TFT is connected to another scan line included in the first scan line group. Another source/drain electrode of the third TFT is connected to the signal line.

A twenty-fifth aspect of the invention is the display device according to the twenty-second aspect, in which the scan-line potential of the n-th scan line takes different values between the first period when display potential is given to the first pixel electrode and the second period when display potential is given to the second pixel electrode, whereby a difference between a variation quantity of pixel potential possessed by the first pixel electrode and a variation quantity of pixel potential possessed by the second pixel electrode, the difference being attributable to variations of scan line potential, is reduced.

A twenty-sixth aspect of the invention is the display device according to the twenty-second aspect. Here, the first TFT circuit includes a first TFT (such as M12 in FIG. 18) of which a source/drain electrode is connected to the first pixel electrode (such as A11 in FIG. 18) and of which a gate electrode is connected to a first scan line (such as Gn+2 in FIG. 18) included in the first scan line group. The second TFT circuit includes a second TFT (such as M13 in FIG. 18) of which a source/drain electrode is connected to the second pixel electrode and of which a gate electrode is connected to a second scan line (such as Gn+1 in FIG. 18) included in the second scan line group. A display signal is given to the second pixel electrode after a display signal is given to the first pixel electrode. Scan-line potential of the n-th scan line in the first period is smaller than scan-line potential in the second period (refer to the explanation regarding the embodiment 4, for example).

A twenty-seventh aspect of the invention is the display device according to the twenty-sixth aspect, in which the first TFT circuit further includes a third TFT (such as M11 in FIG. 18). Source/drain electrodes of the third TFT are severally connected to the signal line and a source/drain electrode of the first TFT. A gate electrode of the third TFT is connected to a third scan line (such as Gn+1 in FIG. 18) included in the first scan line group. The second scan line and the third scan line collectively constitute one identical line.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Now, the preferred embodiments of an image display device according to this invention will be described with reference to the accompanying drawings. In each of the following embodiments, description will be made regarding a liquid crystal display device, which is one type of image display devices.

Embodiment 1

Now, description will be made regarding a embodiment 1 of this invention. The embodiment utilizes different gate-line selection potential values upon selection of two multiplex pixels. In this way, it is possible to reduce a difference in variations of pixel electrode potential between the multiplex pixels caused by a difference in aspects of connection of TFTs.

Figure 1:
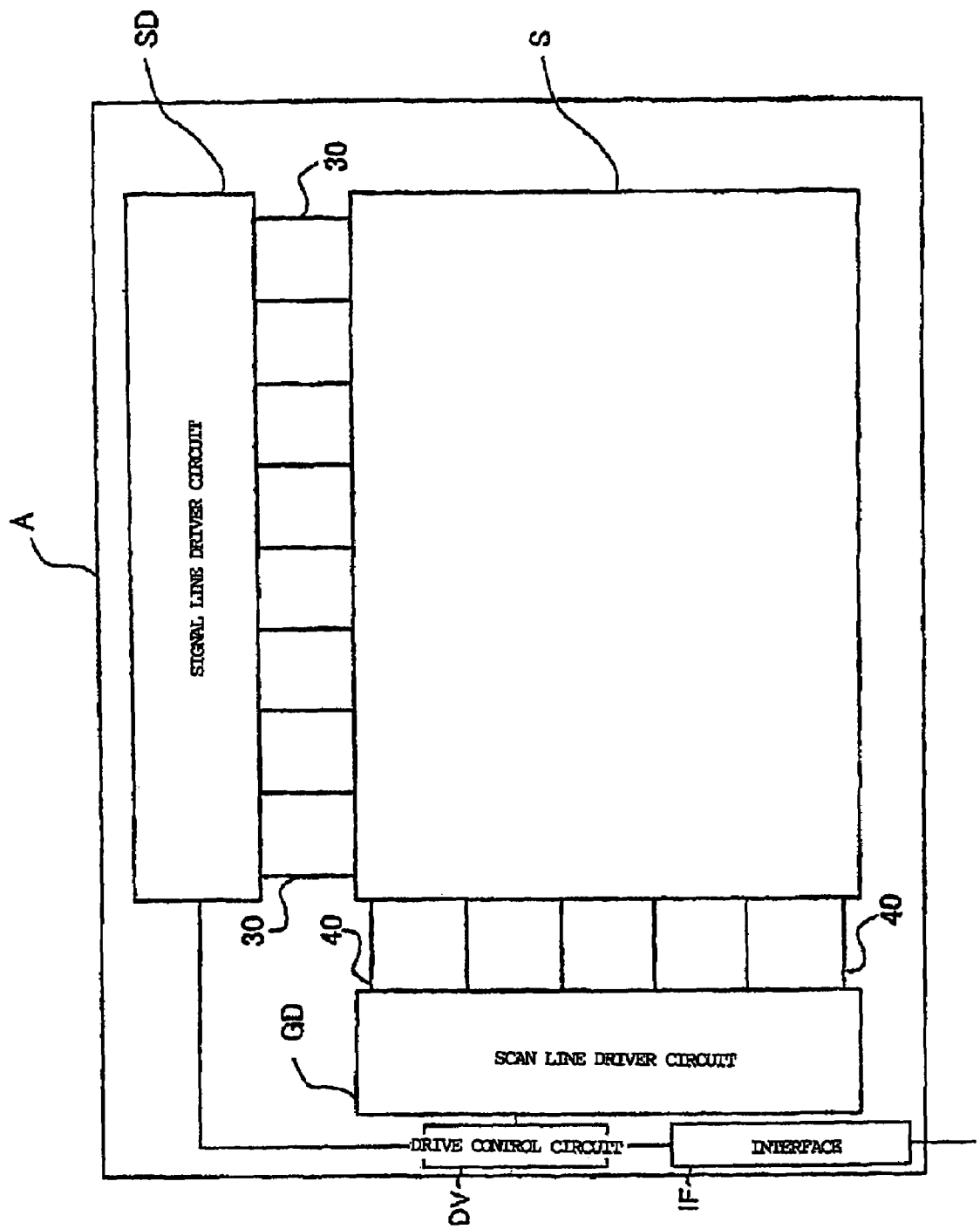
FIG. 1 is a view showing a schematic constitution of a liquid crystal display device according to this invention.
Figure 2:
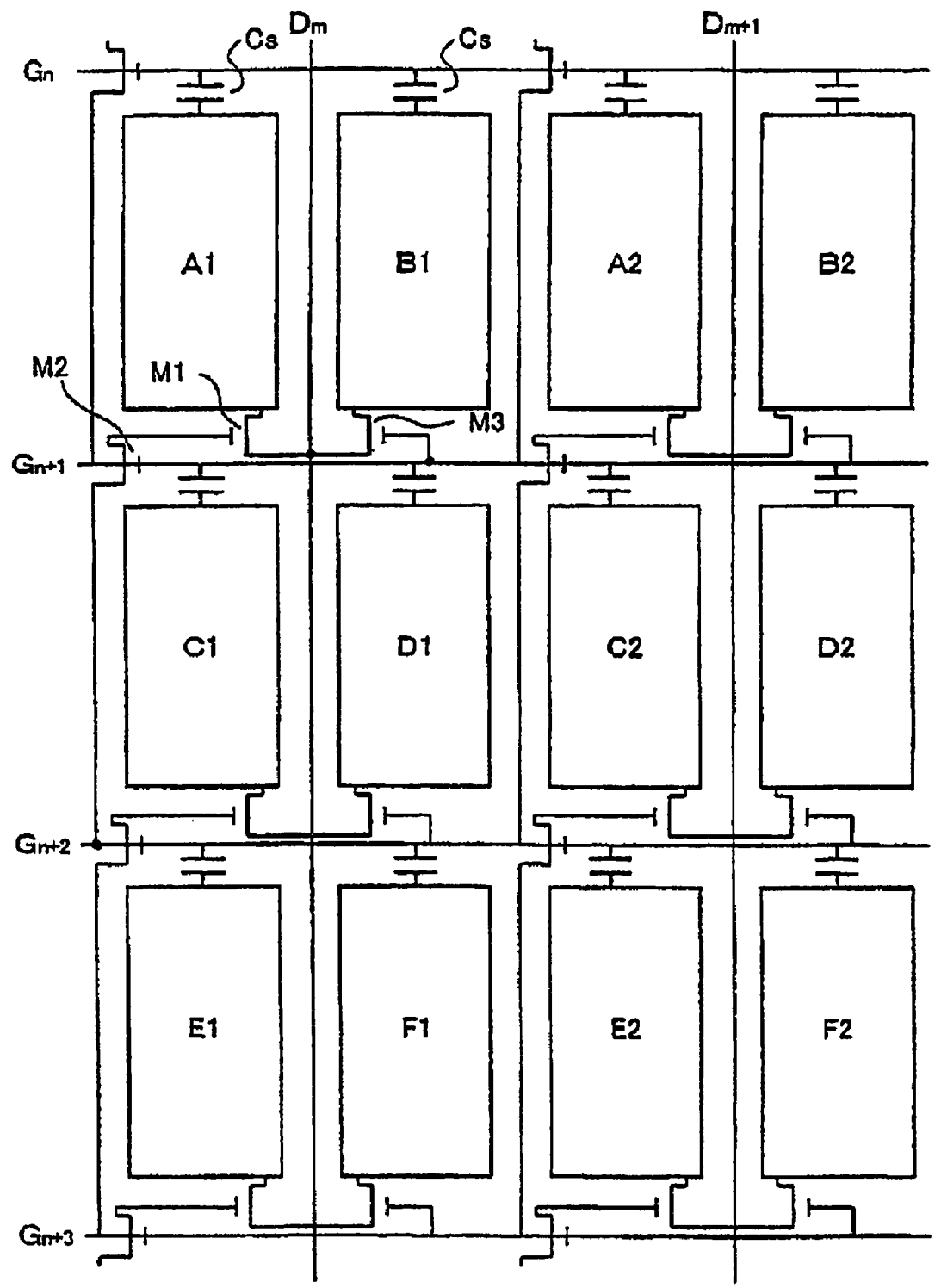
FIG. 2 is a view showing a constitution of an array substrate of a liquid crystal display device according to the embodiment 1.

FIG. 1 is a view showing a principal configuration of an array substrate A of a liquid crystal display device in the embodiment 1 of this invention. Meanwhile, FIG. 2 is a view showing a pixel circuit constitution on the array substrate A. Furthermore, FIG. 3 to FIG. 6 are views showing operations of the circuit on the array substrate A, and FIG. 7 is a timing chart of scan signals.

The liquid crystal display device according to the embodiment 1 is designed in a manner that two adjacent pixels sandwiching one signal line have the signal line in common, whereby the number of signal lines is reduced to half. Note that a liquid crystal display device needs to include elements such as an array substrate, a color filter substrate which is opposed to the array substrate and a backlight unit. However, description will be made herein mainly on characteristic parts of this invention.

As shown in FIG. 1, the array substrate A includes a signal line driver circuit SD for supplying display signals to a plurality of pixel electrodes disposed within a display area S via signal lines 30, and a scan line driver circuit GD for supplying scan signals via scan lines 40. Moreover, a drive control circuit DV is connected with the signal line driver circuit SD and the scan line driver circuit GD. The drive control circuit DV performs overall drive control including synchronous control between the signal line driver circuit SD and the scan line driver circuit GD, based on display control signals inputted from outside via an interface IF. M [multiplied by] N (M and N are arbitrary natural numbers) of pixels are arranged in a matrix on the array substrate.

In FIG. 2, a first TFT (M1), a second TFT (M2) and a third TFT (M3) are disposed as described below with respect to pixel electrodes A1 and B1, which are adjacent to each other while sandwiching a signal line Dm.

To begin with, a source electrode of the first TFT (M1) is connected to the signal line Dm, and a drain electrode thereof is connected to the pixel electrode A1. Moreover, a gate electrode of the first TFT (M1) is connected to a drain electrode of the second TFT. (M2). Here, each of the TFTs is a switching element with three terminals. In a liquid crystal display device, there is an example in which a terminal connected to a signal line is referred to as a source electrode and a terminal connected to a pixel electrode is referred to as a drain electrode. However, there is also another example in which reference is made inversely. That is, it is not uniquely decided as to which electrode except the gate electrode should be referred to as the source electrode or the drain electrode. Therefore, in the following, two electrodes except the gate electrode will be mutually referred to as source/drain electrodes.

Next, a source/drain electrode of the second TFT (M2) is connected to the gate electrode of the first TFT (M1), and the other source/drain electrode thereof is connected to a scan line Gn+2. Therefore, the gate electrode of the first TFT (M1) is connected to the scan line Gn+2 via the second TFT (M2). Meanwhile, a gate electrode of the second TFT (M2) is connected to a scan line Gn+1. Therefore, the first TFT (M1) is turned on only in a period when the adjacent scan lines Gn+1 and Gn+2 are simultaneously set to selection potential, thereby supplying electric potential of the signal line Dm to the pixel electrode A1. Such an aspect indicates that the second TFT (M2) controls turning on and off of the first TFT (M1).

A source/drain electrode of the third TFT (M3) is connected to the signal line Dm and the other source/drain electrode of the third TFT (M3) is connected to the pixel electrode B1. A gate electrode of the third TFT (M3) is connected to the scan line Gn+1. Therefore, the third TFT (M3) is turned on when the scan line Gn+1 is set to the selection potential, thereby supplying the electric potential of the signal line Dm to the pixel electrode B1.

Each of the pixel electrodes A1 and B1 is provided with a display signal from the single signal line Dm. In other words, the signal line Dm can be deemed as a common signal line Dm to the pixel electrodes A1 and B1. Therefore, when the pixels are arranged in a matrix defined by M [multiplied by] N, the number of the signal lines D is equal to M/2.

Now, description will be made regarding a display operation of one group of multiplex pixels. One group of multiplex pixels refers to a plurality of pixels to which display signals are supplied from one signal line, and to a plurality of pixels to which display signals are supplied within one horizontal scanning cycle. Display signals equivalent to one scan inputted from the outside of the display device is given to the pixels in one horizontal scanning cycle. Here, the pixel electrodes A1 and B1 are the multiplex pixels.

To supply the electric potential of the signal line Dm to the pixel electrode A1, the first TFT (M1) needs to be turned on. To turn the first TFT (M1) on, the second TFT (M2) needs to be turned on. If the scan line Gn+1 is set to the selection potential, then the second TFT (M2) is turned on. The electric potential of the scan line Gn+2 is given to the gate electrode of the first TFT (M1) via the second TFT (M2).

Accordingly, the first TFT (M1) is set to on-state when both of the scan lines Gn+1 and Gn+2 are set to the selection potential. In other words, the first TFT (M1) and the second TFT (M2) collectively constitute a switching mechanism to allow passage of display signals from the signal line Dm in the case where both of the scan lines Gn+1 and Gn+2 are set to the selection potential. In this way, the pixel electrode A1 is driven based on a scan signal from the scan line Gn+1 and a scan signal from the scan line Gn+2, whereby the pixel electrode A1 receives the electric potential from the signal line Dm.

The third TFT (M3) is connected to the pixel electrode B1, and a gate electrode thereof is connected to the scan line Gn+1. Therefore, the display potential is supplied from the signal line Dm to the pixel electrode B1 when the scan line Gn+1 is selected.

Although description has been made regarding the pixel electrodes A1 and B1, the above-described constitution is applied similarly to pixel electrodes A2 and B2, pixel electrodes C1 and D1, pixel electrodes C2 and D2, and other pixel electrodes.

Next, operations of the pixel electrodes A1 to D1 depending on selection and non-selection of scan lines Gn+1 to Gn+3 will be described in detail with reference to the circuit diagrams as shown in FIG. 3 to FIG. 6 and to the timing chart of scan signals as shown in FIG. 7.

Diagrams Dm(1) and Dm(2) shown in FIG. 7 denote timing of variations of display signals supplied by the signal line Dm. Here, the diagrams Dm(1) and Dm(2) are timing charts of the display signals severally used for different display modes (different display devices). For example, the diagram Dm(1) corresponds to a dot-inversion drive method and the diagram Dm(2) corresponds to a line-inversion drive method.

Each of the diagrams Dm(1) and Dm(2) indicates two levels of a high level and a low level. These levels correspond to polarities of the display signal. An actual display signal includes multiple levels for gradation display. However, for the purpose of facilitating description of the invention, gradation levels will not be considered herein. In the case of an operation by the diagram Dm(1), polarities between the pixel electrodes A1 and B1 are different; meanwhile, polarities between the pixel electrodes A1 and C1 are equal. On the other hand, in the case of an operation by the diagram Dm(2), the polarities between the pixel electrodes A1 and B1 are equal; meanwhile, the polarities between the pixel electrodes A1 and C1 are different. Moreover, in FIG. 7, diagrams for the scan lines Gn to Gn+3 indicate selection and non-selection of the scan lines Gn to Gn+3. To be more precise, if one of the diagrams is set to a high level (the selection potential), then the diagram indicates that the relevant scan line is selected. If the diagram is set to a low level (non-selection potential), then the diagram indicates that the relevant scan line is not selected. FIG. 7 illustrates two kinds of high levels, which have mutually different potential levels.

Figure 3:
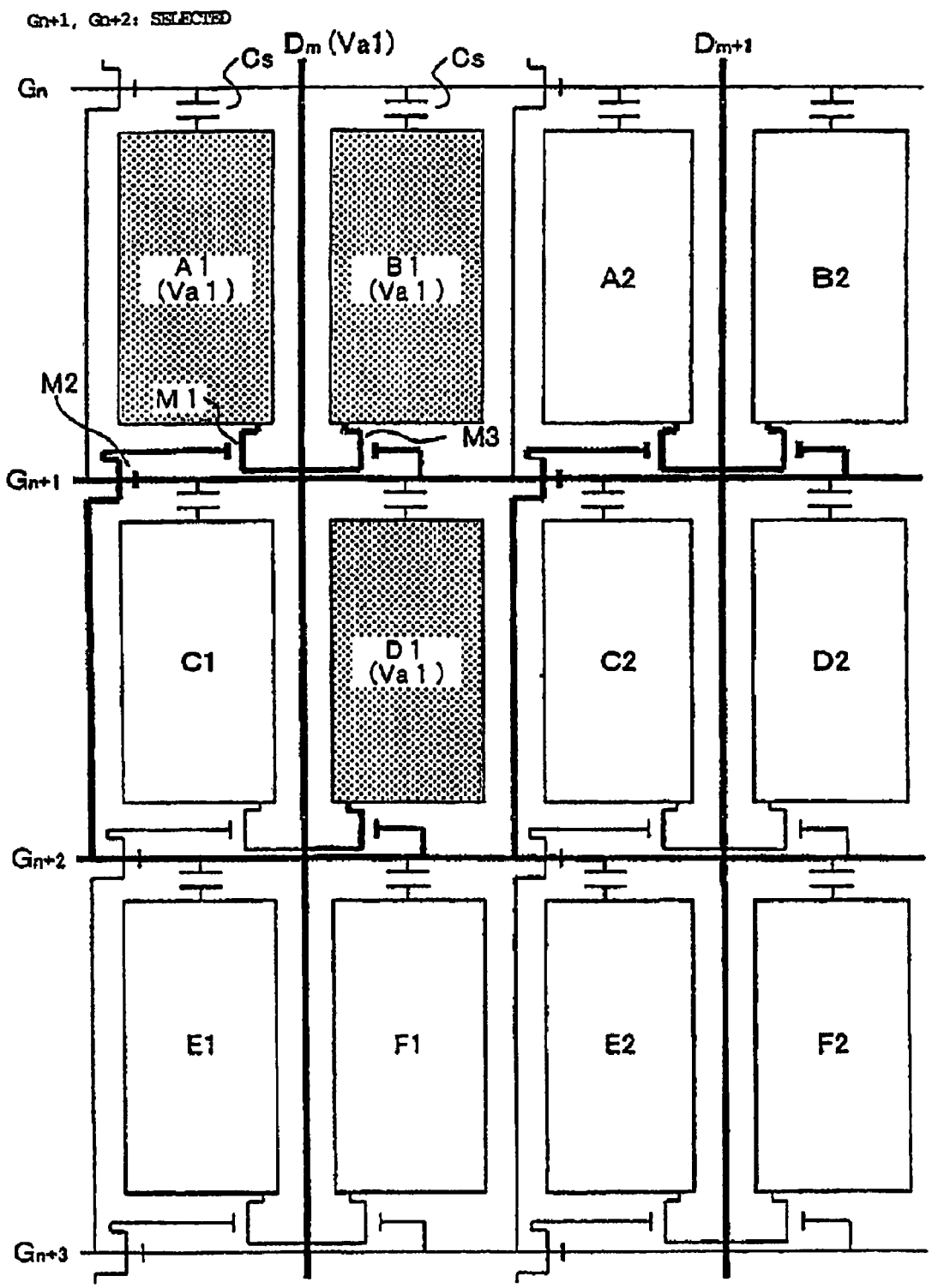
FIG. 3 is a view showing an operation of the array substrate of the liquid crystal display device according to the embodiment 1.

FIG. 3 illustrates states of display potential and scanning potential at timing t1 shown in FIG. 7. The selection potential is given to both of the scan lines Gn+1 and Gn+2. In FIG. 3, states of selection of the scan lines Gn+1 and Gn+2 are indicated with bold lines. Other scan lines are set to the non-selection potential. The display potential is given to each signal line. Attention should be made herein to the pixel electrodes A1, B1, C1 and D1. At the timing t1, the first, the second and the third TFTs (namely, M1, M2 and M3) are turned on. As shown in FIG. 3, electric potential (Va1) to be given by the signal line Dm to the pixel electrode A1 is supplied to the pixel electrodes A1, B1 and D1. Here, the electric potential Val for the pixel electrode A1 is determined.

Figure 4:
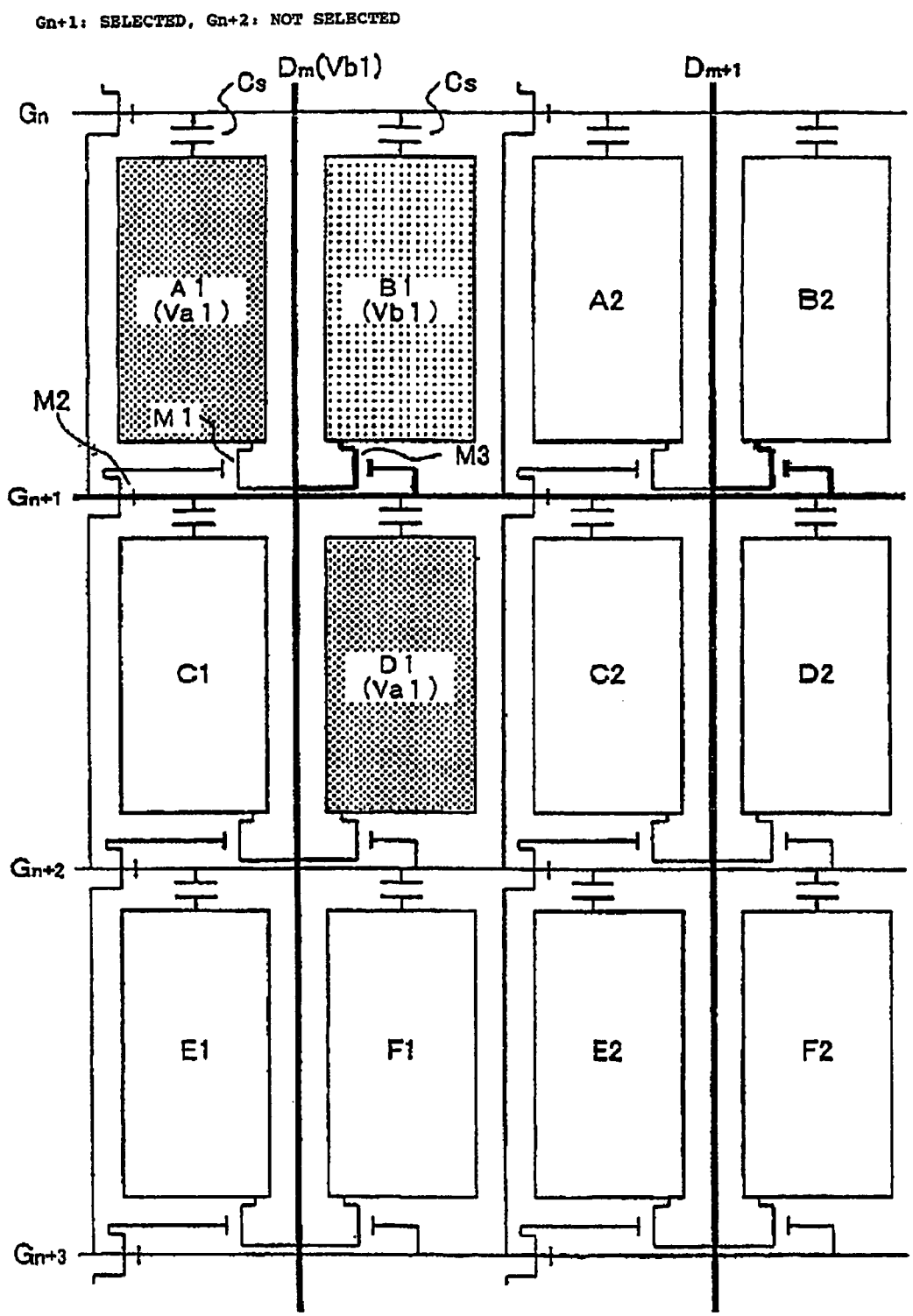
FIG. 4 is another view showing an operation of the array substrate of the liquid crystal display device according to the embodiment 1.

FIG. 4 illustrates states of display potential and scanning potential at timing t2 shown in FIG. 7. The selection potential is given to the scan line Gn+1. Other scan lines are set to the non-selection potential. The electric potential to be supplied from the signal line Dm at the timing t2 is changed to electric potential Vb1 to be given to the pixel electrode B1 after the scan line Gn+2 is set to the non-selection potential. Since the scan line Gn+2 is not selected, the TFT M1 is turned off. Since the scan line Gn+1 is set to the selection potential, the TFT M3 is turned on. Therefore, display potential Vb1 is given by the signal line Dm to the pixel electrode B1. The electric potential of the pixel electrode B1 is determined as the display potential Vb1. In this way, the electric potential of the signal line Dm is supplied to the pixel electrodes A1 and B1 by time division.

After the scan line Gn+1 is set to the non-selection potential, the electric potential of the signal line Dm is changed to electric potential Vc1 to be given to the pixel electrode C1.

Figure 5:
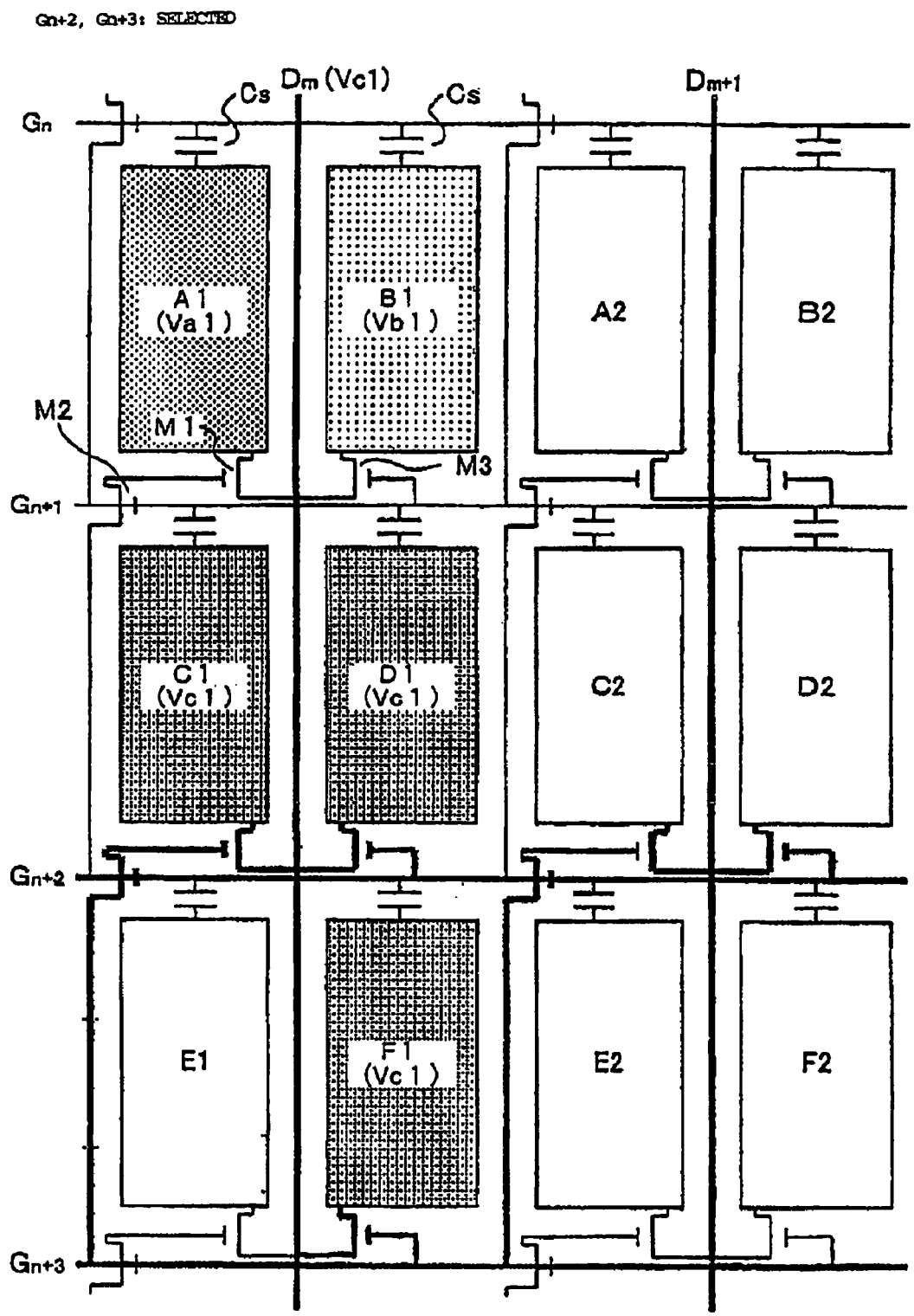
FIG. 5 is another view showing an operation of the array substrate of the liquid crystal display device according to the embodiment 1.

FIG. 5 illustrates states of display potential and scanning potential at timing t3 shown in FIG. 7. The selection potential is given to both of the scan lines Gn+2 and Gn+3. Other scan lines are set to the non-selection potential. At the timing t3, electric potential (Vc1) to be given by the signal line Dm to the pixel electrode C1 is supplied to the pixel electrodes C1, D1 and F1. Here, the electric potential Vc1 for the pixel electrode C1 is determined.

Figure 6:
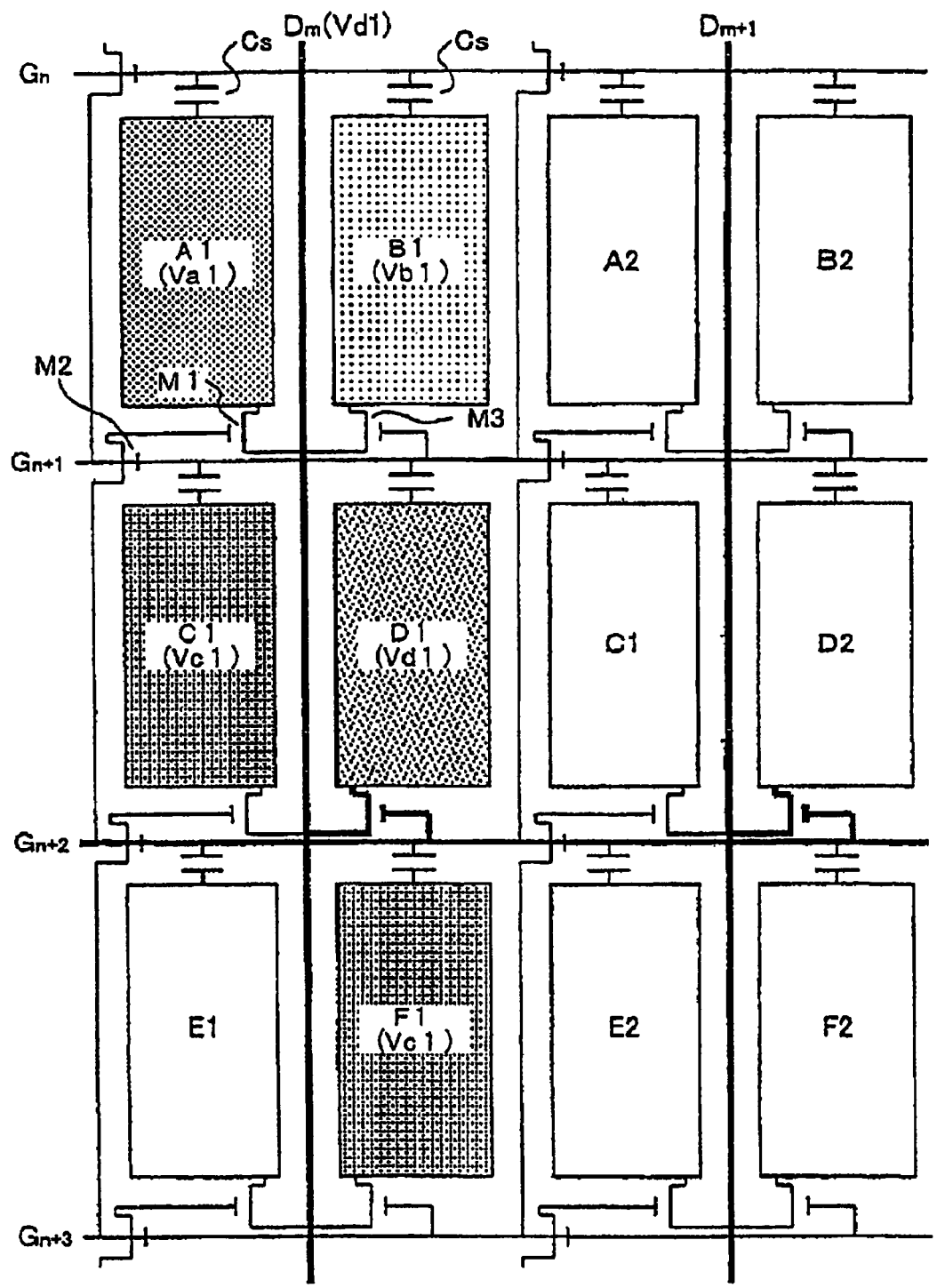
FIG. 6 is another view showing an operation of the array substrate of the liquid crystal display device according to the embodiment 1.
Figure 7:
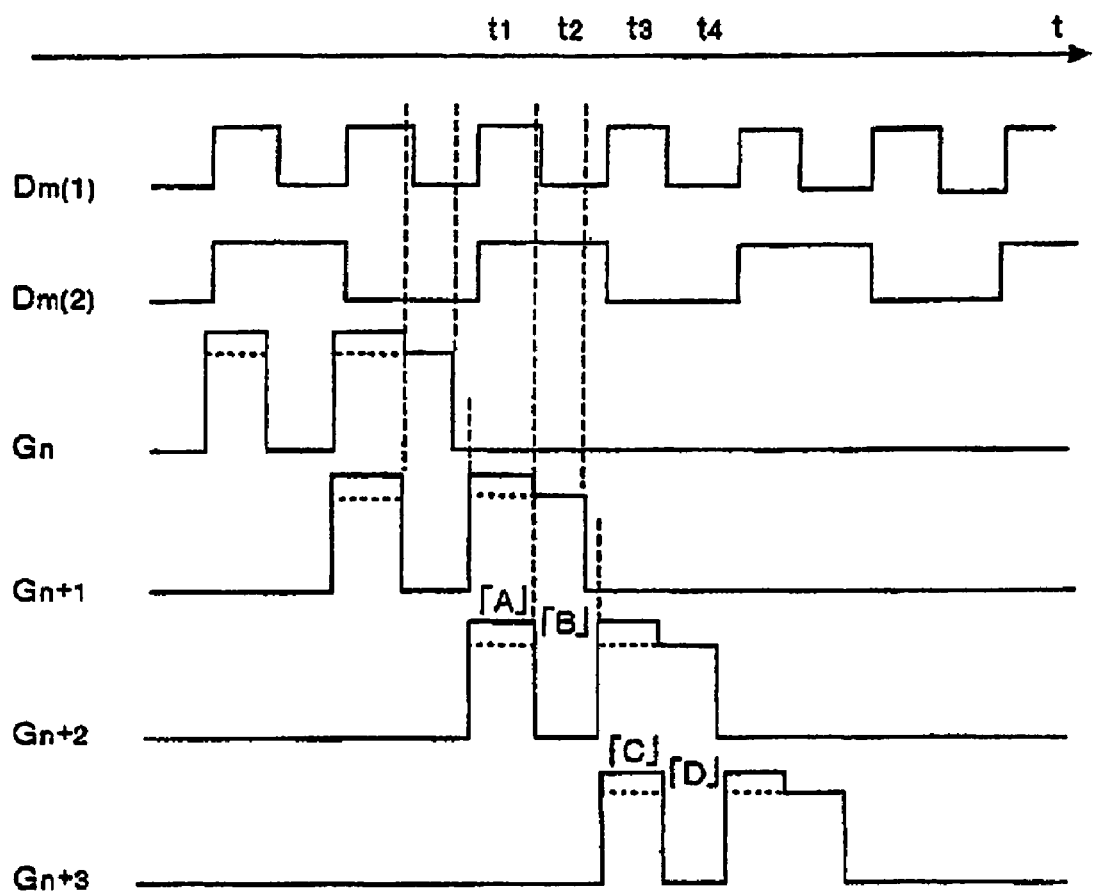
FIG. 7 is a timing chart of scan signals of the liquid crystal display device according to the embodiment 1.

FIG. 6 illustrates states of display potential and scanning potential at timing t4 shown in FIG. 7. The selection potential is given to the scan line Gn+2. Other scan lines are set to the non-selection potential. The electric potential to be supplied from the signal line Dm is changed to electric potential Vd1 to be given to the pixel electrode D1 after the scan line Gn+3 is set to the non-selection potential. Since the scan line Gn+3 is not selected, the display potential is not supplied to the pixel electrode C1. Since the selection potential is given to the scan line Gn+2, the display potential Vd1 is given by the signal line Dm to the pixel electrode D1. Electric potential of the pixel electrode D1 is determined as the display potential Vd1. In this way, the electric potential of the signal line Dm is supplied to the pixel electrodes C1 and D1 by time division.

Thereafter, similar operations will be carried out serially with respect to pixels on subsequent stages.

In this embodiment 1, as shown in FIG. 7, different scanning potential values are given to the respective pixel electrodes upon giving the display signals to the pixel electrodes of the multiplex pixels. For example, the scanning potential at the timing t1 when a voltage to the pixel electrode A is determined is designed so as to have a greater value than the scanning potential at the timing t2 when a voltage to the pixel electrode B is determined. Note that sizes of storage capacitors Cs or the pixel electrodes are designed as mutually equal in the embodiment 1. The TFT (M1) and the TFT (M3) are designed as the same size, and the TFT (M2) is designed as smaller than other two TFTs. It is preferable that the TFT (M1) and the TFT (M3) have the same size because these TFTs transmit the display signals. Meanwhile, it is preferable to design the TFT (M2) smaller in order to enhance an aperture ratio.

Now, description will be made regarding electric potential variations of the pixel electrodes of the multiplex pixel with reference to FIG. 8 and FIG. 9. First, description will be made regarding a case where the scanning potential at the same value is given to the multiplex pixels A1 (A) and B1 (B) with reference to FIG. 8.

Figure 8:
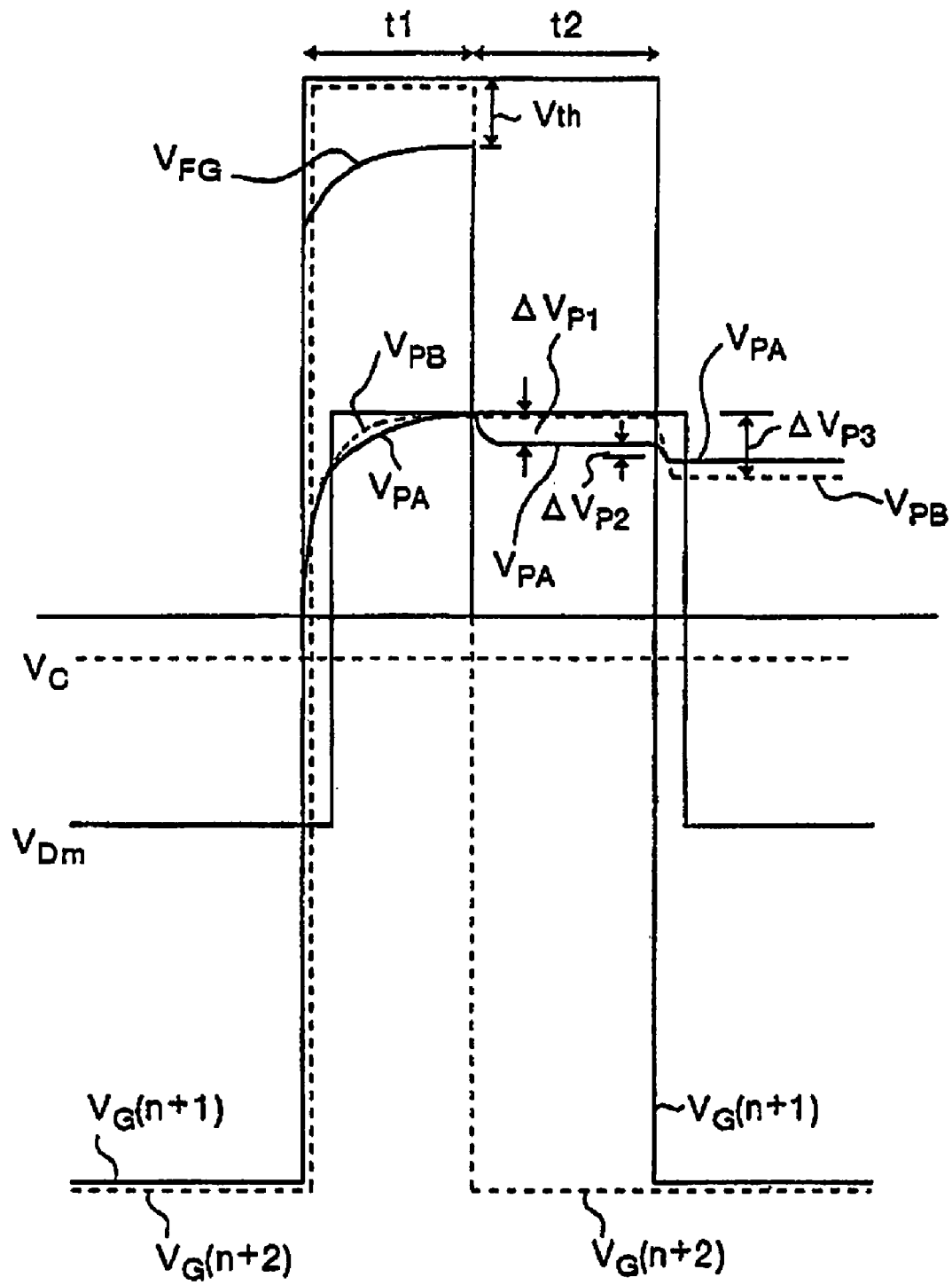
FIG. 8 is a graph showing drive pulses and voltage variations in the vicinity of pixel electrodes of a conventional liquid crystal display device provided with an array circuit structure of the embodiment 1.

In FIG. 8, reference code $V_G(n+1)$ denotes electric potential to be applied to the scan line Gn+1. Reference code $V_G(n+2)$ denotes electric potential to be applied to the scan line Gn+2. Reference code $V_{Dm}$ denotes display potential to be given to the signal line Dm. Reference code $V_c$ denotes common electric potential. Reference code $V_{PA}$ denotes electric potential of the pixel electrode A1 and reference code $V_{PB}$ denotes electric potential of the pixel electrode B1. Reference code $V_{FG}$ denotes electric potential of the gate electrode of the TFT (M1). Here, it is assumed that the display potential of the same polarity and the same value are given to the pixel electrodes A1 and B1.

At the timing t1, the electric potential $V_G(n+1)$ applies a sufficient voltage to the gates of the TFT (M2) and the TFT (M3), thus turning on the TFT (M2) and the TFT (M3). Similarly, the electric potential $V_G(n+2)$, which is applied to the scan line Gn+2, applies a sufficient voltage to the gate of the TFT (M1) via the TFT (M2), thus setting the TFT (M1) to on-state.

In this way, the electric potential $V_{PA}$ of the pixel electrode A1 is set to almost the same electric potential value as the electric potential $V_{Dm}$ at the end of the timing t1. In addition, the electric potential $V_{PB}$ of the pixel electrode B1 is set to almost the same electric potential value as the electric potential $V_{Dm}$.

However, an electric potential variation associated with turning on-and-off of the TFTs occurs after the timing t1, whereby the electric potential $V_{PA}$ of the pixel electrode A1 falls by $[delta]V_{p1}$. A fall in the electric potential $V_G(n+2)$ of the scan line Gn+2 (in the interval between the timing t1 and timing t2) causes the fall in the electric potential $V_{PA}$ of the pixel electrode A1 as equivalent to $[delta]V_{p1}$ via parasitic capacitance between the scan line Gn+2 and the pixel electrode A1. The parasitic capacitance between the scan line Gn+2 and the pixel electrode A1 is mainly attributable to parasitic capacitance between the gate electrode of the TFT (M1) and the pixel electrode A1.

Furthermore, a fall in the electric potential $V_G(n+1)$ of the scan line Gn+1 (in the interval between the timing t2 and timing t3) causes a fall in the electric potential $V_{PA}$ of the pixel electrode A1 as equivalent to $[delta]V_{P2}$ via parasitic capacitance between the scan line Gn+1 and the pixel electrode A1. The parasitic capacitance between the scan line Gn+1 and the pixel electrode A1 is mainly attributable to capacitance through the TFT (M1) and the TFT (M2). In this embodiment, the electric potential variation $[delta]V_{P1}$ is greater than the electric potential variation□@$[delta]V_{P2}$. This is attributable to a fact that the electric potential variation $[delta]V_{P2}$ depends on the parasitic capacitance through the two TFTs, and the parasitic capacitance between the scan line Gn+2 and the pixel electrode A1 is greater than the parasitic capacitance between the scan line Gn+1 and the pixel electrode A1.

The electric potential $V_{PB}$ of the pixel electrode B1 is set to almost the same electric potential as the electric potential $V_{Dm}$ at the end of the timing t2. However, an electric potential variation associated with turning on-and-off of the TFTs occurs after the timing t2, whereby the electric potential $V_{PB}$ of the pixel electrode B1 falls by $[delta]V_{P3}$. The fall in the electric potential $V_G(n+1)$ of the scan line Gn+1 (in the interval between the timing t2 and the timing t3) causes the fall in the electric potential $V_{PB}$ of the pixel electrode B1 as equivalent to [delta]$V_{p3}$ via parasitic capacitance between the scan line Gn+1 and the pixel electrode B1. The parasitic capacitance between the scan line Gn+1 and the pixel electrode B1 is mainly attributable to parasitic capacitance between the gate electrode of the TFT (M3) and the pixel electrode B1.

What is important here is a fact that the electric potential variations associated with turning on-and-off of the TFTs show different degrees between the electric potential $V_{PA}$ of the pixel electrode A1 and the electric potential $V_{PB}$ of the pixel electrode B1. In this embodiment, the electric potential variation [delta]$V_{P3}$ of the pixel electrode B1 is greater than the electric potential variation ([delta]$V_{P1}$+[delta]$V_{P2}$) of the pixel electrode A1. Such a fact can be explained as follows. Specifically, gate potential of the TFT (M1) is given via the TFT (M2). Since the TFT (M2) has a threshold, the electric potential given to the gate electrode of the TFT (M1) becomes lower than the selection potential of the scan line Gn+2. Therefore, the fall in the electric potential of the gate electrode of the TFT (M1) is smaller than the fall in the electric potential of the gate electrode of the TFT (M3), which is directly connected to the scan line Gn+1. Since the parasitic capacitance between the TFT (M1) and the pixel electrode A1 and the parasitic capacitance between the TFT (M3) and the pixel electrode B1 have almost the same value, the electric potential variation [delta]$V_{P3}$ becomes greater than the electric potential variation [delta]$V_{P1}$. Meanwhile, the electric potential variation [delta]$V_{P2}$ is typically smaller than the electric potential variation [delta]$V_{P3}$ or [delta]$V_{P1}$. As a result, the electric potential variation [delta]$V_{P3}$ of the pixel electrode B1 becomes greater than the electric potential variation ([delta]$V_{P1}$+[delta]$V_{P2}$) of the pixel electrode A1.

It should be noted that the fall in the electric potential of the scan line Gn+2 does not influence on the pixel electrode B1, because the display potential is given to the pixel electrode B1 after the fall in the electric potential of the scan line Gn+2.

Here, assuming that the TFTs are instantaneously shielded, then an electric potential variation [delta]VP of a pixel electrode attributable to a scan-line potential variation [delta]Vg after writing electric potential into the pixel electrode is generally defined as follows:

$$\Delta VP = \Delta Vg \cdot Cgp/Cpix \quad (1)$$

Here, Cgp is parasitic capacitance between a scan line (or a gate electrode) and the pixel electrode, and Cpix is electric capacitance (pixel capacitance) of the pixel electrode including the parasitic capacitance Cgp. Therefore, if the pixels have different parasitic capacitance values, then the electric potential variations of the pixel electrodes after writing the electric potential into the pixel electrodes become mutually different. Moreover, even in the case where the parasitic capacitance Cgp and the pixel capacitance Cpix are the same among the pixels, if the scan-line potential variations [delta]Vg show different values from the viewpoint of the pixel electrodes owing to a difference in pixel structures such as different connection modes of active elements, then a difference in the electric potential variations occurs among the pixels.

As a result of existence of the difference in the electric potential variations between the pixel electrodes A1 and B1 as described above, a difference is generated in effective voltage values, which are controlled by the pixel electrodes A1 and B1 to be applied to liquid crystal, thereby ultimately causing luminance unevenness of a screen. Moreover, such an aspect generates direct current components upon alternating current drive, thus causing display defects on a screen such as image sticking.

Figure 9:
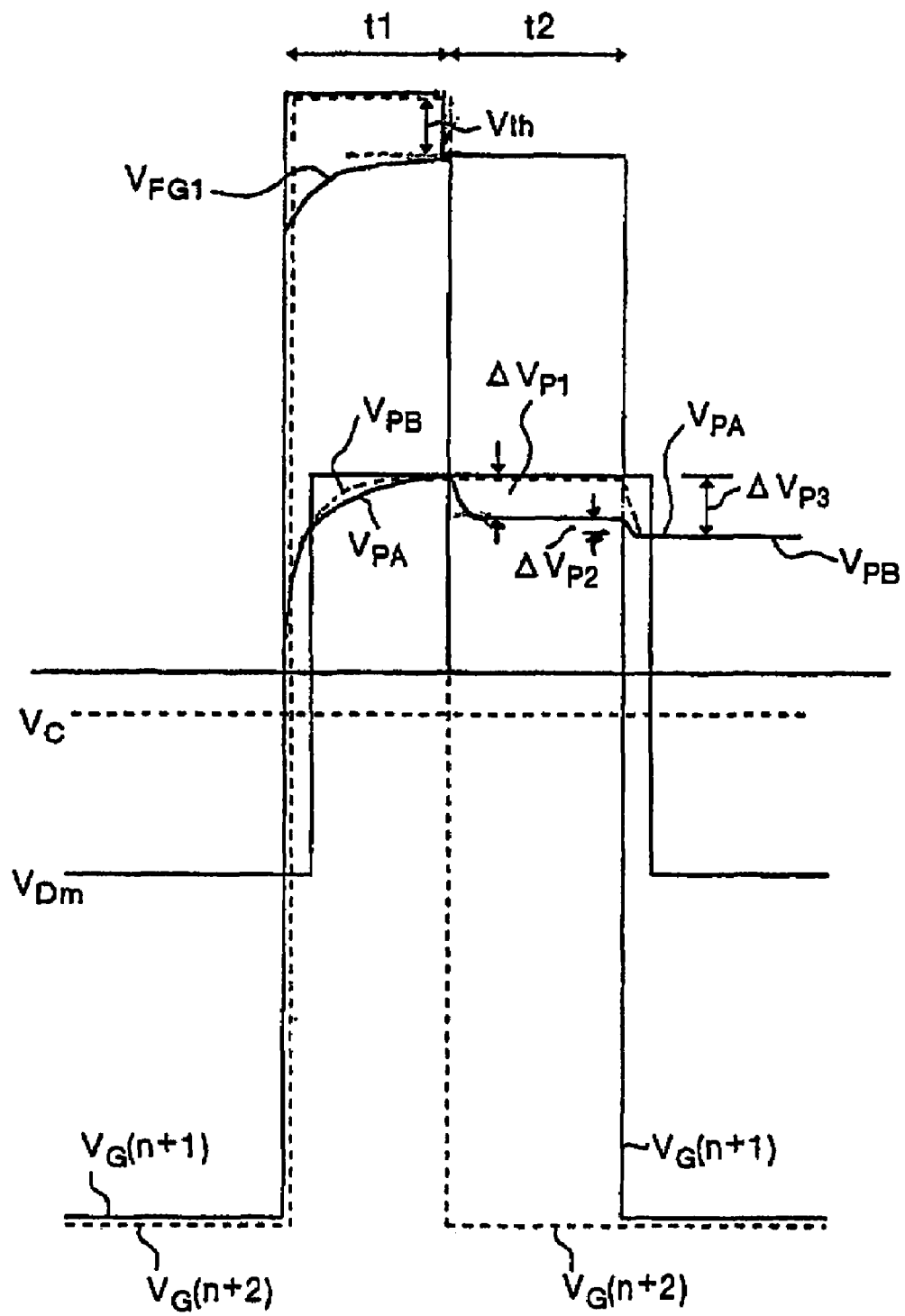
FIG. 9 is a graph showing drive pulses and voltage variations in the vicinity of pixel electrodes of the liquid crystal display device according to the embodiment 1.

Accordingly, in the embodiment 1, the difference in the electric potential variations between the pixel electrodes A1 and B1 is reduced by varying the selection potential of the scan lines as shown in FIG. 9. Moreover, preferably, the electric potential $V_{PA}$ of the pixel electrode A1 and the electric potential $V_{PB}$ of the pixel electrode VPB (in the case where the same display signal is applied thereto) are controlled ultimately to take almost the same value. In other words, scan-line selection potential Vgha and scan-line selection potential Vghb are set to different electric potential values, so that a sum of pixel potential variation [delta]$V_{PA}$ after writing the display potential into the pixel electrode A1 and pixel potential variation [delta]$V_{PB}$ after writing the potential into the pixel electrode B1 take almost the same value.

The electric potential variations [delta]$V_{P1}$, [delta]$V_{P2}$ and [delta]$V_{P3}$ of the pixel electrodes have correlations defined as follows:

$$\Delta V_{P1} = (\Delta Vgha - Vth) \times Cg(n+2)pa/Cpix$$

$$\Delta V_{P2} = \Delta Vghb \times Cg(n+1)pa/Cpix$$

$$\Delta V_{P3} = \Delta Vghb \times Cg(n+1)pb/Cpix$$

provided that $$\Delta Vgha = Vgha - Vgl$$

$$\Delta Vghb = Vghb - Vgl$$

wherein

Vgha: the selection potential of the scan line at the timing t1 (a writing period for the pixel electrode A1);

Vghb: the selection potential of the scan line at the timing t2 (a writing period for the pixel electrode B1);

Vgl: the non-selection potential of the scan line (the low level);

Cg(n+1)pa: the parasitic capacitance between the scan line Gn+1 and the pixel electrode A1;

Cg(n+2)pa: the parasitic capacitance between the gate electrode of the TFT (M1) and the pixel electrode A1; and Cg(n+1)pb: the parasitic capacitance between the scan line Gn+1 and the pixel electrode B1.

The electric potential $V_{PA}$ and the electric potential $V_{PB}$ become ultimately equal by means of selecting the scan-line selection potential values Vgha and Vghb which satisfy ([delta]$V_{P1}$+[delta]$V_{P2}$=[delta]$V_{P3}$). Here, if the value of the electric potential variation [delta]$V_{P2}$ is small and ignorable, then $$\Delta V_{P1} = \Delta V_{P3}$$

is applicable. Here, the difference between [delta]$V_{P1}$ and [delta]$V_{p3}$ is mainly attributable to a potential difference Vth. Therefore, if a potential difference equivalent to the potential difference Vth is added to the scan-line potential Vg(n+1) and the scan-line potential Vg(n+2) at the timing t1 (Vgha=Vghb+Vth), then the electric potential variation [delta]$V_{p1}$ and the electric potential variation [delta]$V_{P3}$ become mutually equal. As a result, as shown in FIG. 9, the electric potential $V_{PA}$ and the electric potential $V_{PB}$ take virtually the same electric potential value. In this way, luminance unevenness will not occur on the screen and display defects will also disappear. If the electric potential variation [delta]$V_{P2}$ is not ignorable, then the scan-line selection potential Vgha should be set appropriately to offset the electric potential variation [delta]$V_{P2}$, such that the electric potential $V_{PA}$ and the electric potential $V_{PB}$ are severally set to an equal electric potential value.

Figure 10:
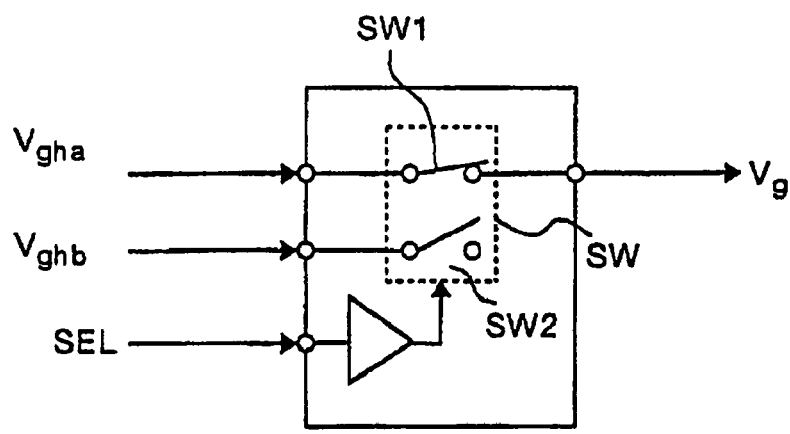
FIG. 10 is a view showing a constitution of a switching circuit for use in the liquid crystal display device according to the embodiment 1.
Figure 11:
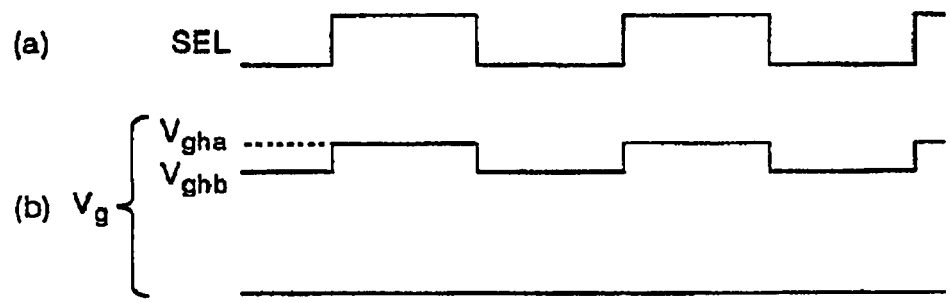
FIG. 11 is a graph showing input and output waveforms of the switching circuit shown in FIG. 10.

It is possible to supply the scan-line selection potential Vgha and the scan-line selection potential Vghb to the scan line by use of a circuit as shown in FIG. 10. FIG. 10 is a circuit diagram showing a configuration of a switching circuit disposed inside the scan line driver circuit GD. Meanwhile, FIG. 11 is a timing chart of the switching circuit shown in FIG. 10. In FIG. 10 and FIG. 11, the scan-line selection potential Vgha and the scan-line selection potential Vghb are inputted from outside to the switching circuit via respective selection potential lines. In accordance with a selection signal SEL inputted from the outside, either the scan-line selection potential Vgha or the scan-line selection potential Vghb is selected by a selection circuit, whereby one of the scan-line selection potential is outputted to output terminals of the scan line driver circuit toward the respective scan lines 40.

Figure 12:
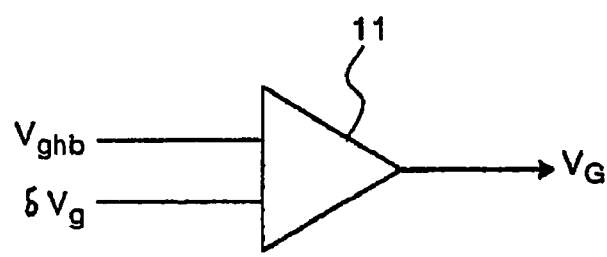
FIG. 12 is a view showing a constitution of an adder-subtracter circuit for use in the liquid crystal display device according to the embodiment 1.
Figure 13:
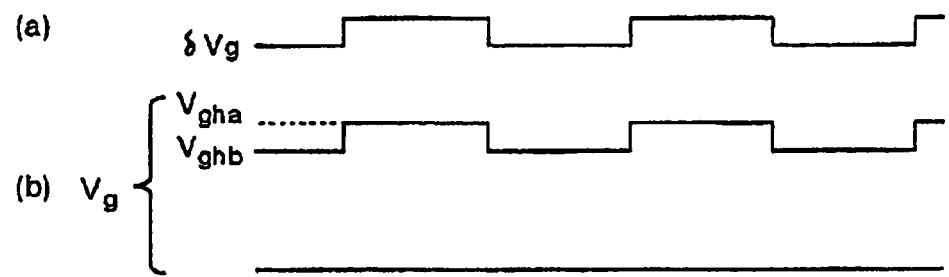
FIG. 13 is a graph showing input and output waveforms of the adder-subtracter circuit shown in FIG. 12.

Alternatively, it is possible to supply the above-mentioned scan-line selection potential Vgha and the scan-line selection potential Vghb to the scan line by use of a circuit as shown in FIG. 12. FIG. 12 is a circuit diagram showing a configuration of an adder-subtracter circuit disposed inside the scan line driver circuit GD. Meanwhile, FIG. 13 is a timing chart of the adder-subtracter circuit shown in FIG. 12. In FIG. 12 and FIG. 13, the adder-subtracter circuit functions as an adder circuit, in which the circuit adds a scan-line selection potential difference [small delta]Vg supplied from the outside to the scan-line selection potential Vghb supplied from the outside, and then outputs a result of addition as the scan-line selection potential Vgha or Vghb. When the adder-subtracter circuit functions as a subtracter circuit, the scan-line selection potential Vgha and the scan-line selection potential difference [small delta]Vg are supplied from the outside, and the circuit subtracts the scan-line selection potential difference [small delta]Vg from the scan-line selection potential Vgha. A result of subtraction is outputted as the scan-line selection potential Vgha or Vghb.

Note that disposition of the above-described switching circuit or the adder-subtracter circuit is not limited to the inside of the scan line driver circuit GD. Instead, the switching circuit or the adder-subtracter circuit may be disposed on other constituents such as the drive control circuit DV. Moreover, each signal such as electric potential to be inputted to the switching circuit or the adder-subtracter circuit may be also supplied from the inside of the switching circuit or the adder-subtracter circuit.

Furthermore, in the above-described embodiment 1, the electric potential $V_{PA}$ and the electric potential $V_{PB}$ of the pixel electrodes A1 and B1, respectively, are eventually equalized by increasing the value of the scan-line selection potential Vgha, which is relevant to determination of the electric potential of the pixel electrode A1. However, without limitations to the foregoing, the value of the scan-line selection potential Vghb relevant to determination of the electric potential of the pixel electrode B1 may be decreased instead. It is attributable to the fact that the scan-line selection potential Vgha or Vghb generally possesses a large margin to turn on the respective TFTs.

Figure 14:
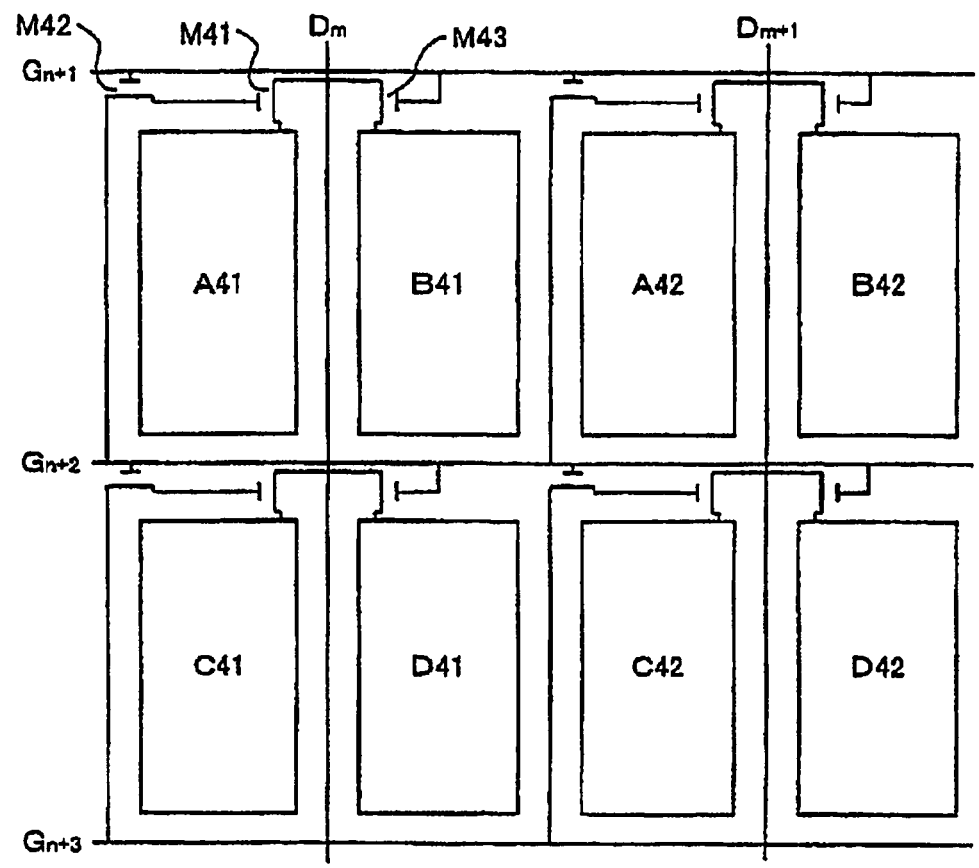
FIG. 14 is a view showing a circuit constitution of an array substrate of a liquid crystal display device according to the embodiment 2.

Whereas the storage capacitors Cs are formed by utilizing the scan lines in the embodiment 1, it is also possible to adopt the invention to a display device including independent storage capacitor electrodes without utilizing scan lines. FIG. 14 shows pixel structures of the display device including the independent storage capacitor electrodes. Attention should be made to a group of multiplex pixels A41 and B41. At timing t1 when a scan line Gn+1 and a scan line Gn+2 are set to selection potential, display potential is given to the pixel electrode A41. At timing t2 subsequent to the timing t1, the scan line Gn+1 is set to the selection potential and the scan line Gn+2 is set to non-selection potential, whereby the display potential is supplied to the pixel electrode B41.

By controlling the display potential and the selection potential as similar to the previous description, a difference in pixel potential variations between pixels can be reduced. Reference codes M41, M42 and M43 in FIG. 14 corresponds to the reference codes M1, M2 and M3 in FIG. 2, respectively. The scan lines denoted by the same codes in FIG. 2 and in FIG. 14 are controlled similarly.

This embodiment has focused on the difference in the electric potential variations between the pixel electrodes attributable to the difference in the electric potential to be given to the gate electrodes of the TFTs, and has described one mode for compensating for the difference. Because, it is the difference in the gate potential which constitutes one of principal factors for causing the pixel potential variation in the case of the pixel structures including the TFT circuits as described in this embodiment. Nevertheless, the pixel potential variation attributable to the parasitic capacitance between the scan line for use in pixel selection and the pixel electrode may be also caused by other factors. For example, in this embodiment, the electric potential variation [delta]$V_{P3}$ of the pixel electrode B1 is greater than the electric potential variation ([delta]$V_{P1}$+[delta]$V_{P2}$) of the pixel electrode A1. However, if the size of the TFT (M2) is as large as the sizes of other TFTs, then the electric potential variation [delta]$V_{P2}$ becomes substantially great, whereby a variation quantity of electric potential between the pixel electrodes A1 and B1 may be reversed to the foregoing. Therefore, it is needless to say that the electric potential for compensation can be determined comprehensively according to correlations with other factors. These remarks are also applicable to the following embodiments.

Embodiment 2

In the above-described embodiment 1, the TFT (M1) and the TFT (M3) connected to the pixel electrodes are assumed to be of the same size. In the following embodiment 2, a difference in electric potential variations of pixels are compensated by setting capacitances of TFTs individually and thereby differentiating the capacitances. In this embodiment, a pixel circuit structure is similar to that of the embodiment 1 (as shown in FIG. 2).

Figure 15:
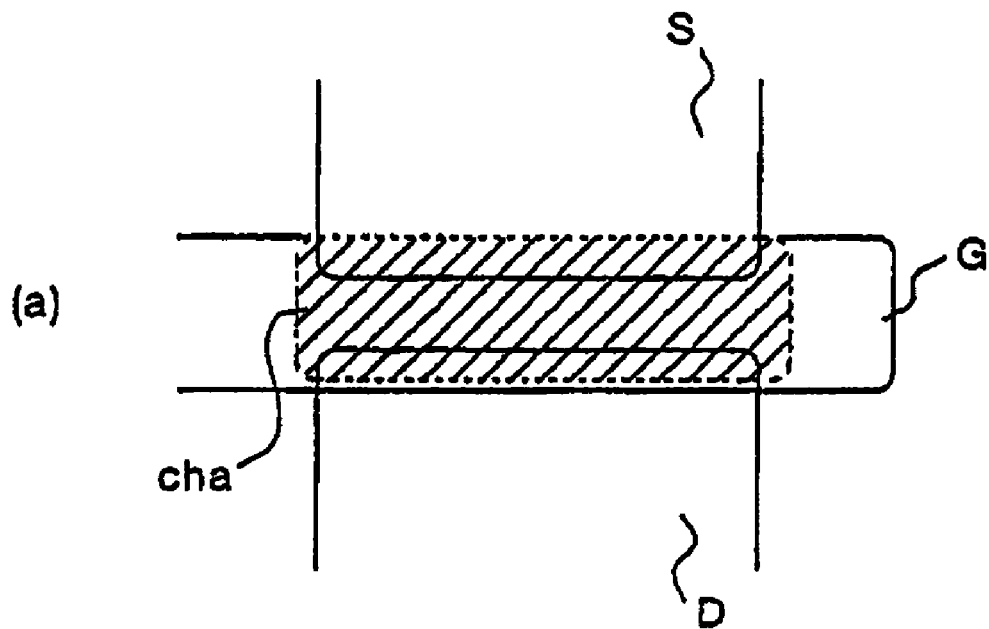
FIGS. 15(a) and 15(b) are plan views of TFTs for use in the liquid crystal display device according to the embodiment 2.
Figure 15:
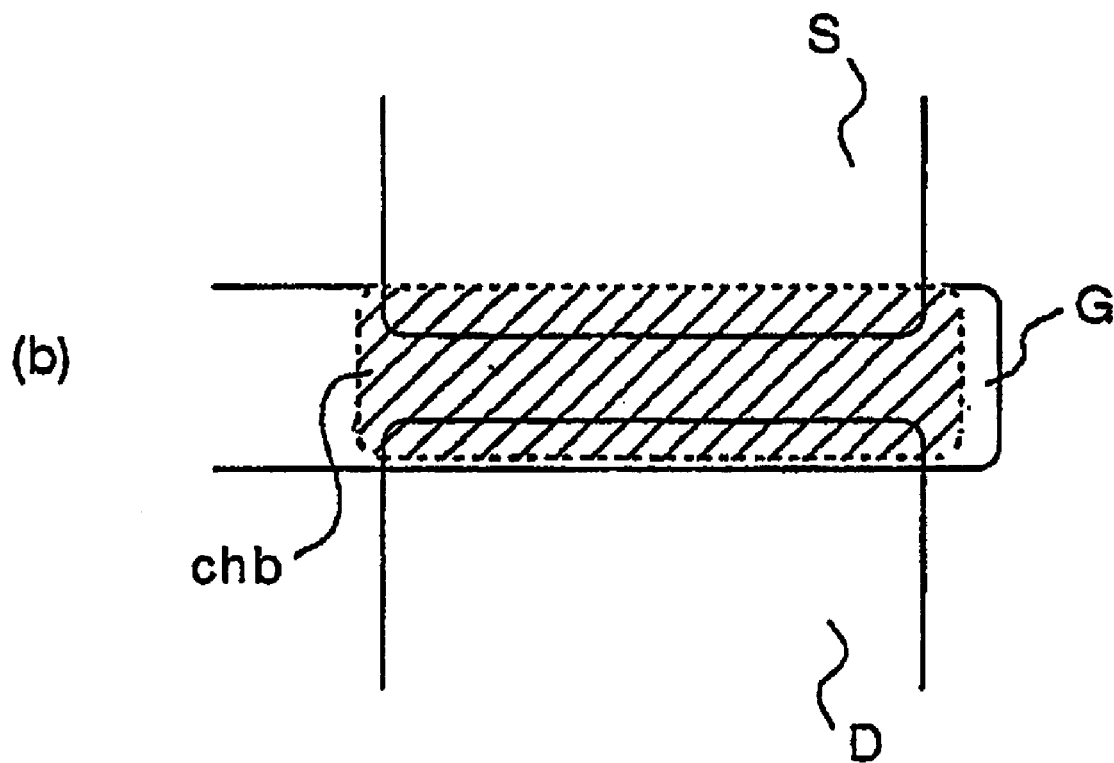

FIGS. 15(a) and 15(b) are views schematically showing planes of TFTs for use in the embodiment 2. FIG. 15(a) shows a TFT in which capacitances between a source S, a drain D and a gate G thereof are reduced, what it calls a TFT of a reduced size. On the contrary, FIG. 15(b) shows a TFT of an increased size. As the size of the TFT is made larger, capacitance between a source/drain electrode and a gate electrode becomes larger. As it has been described in the embodiment 1, an electric potential variation of pixel potential, which is attributable to a variation of scan-line potential, is determined in accordance with a variation quantity of the scan-line potential and parasitic capacitance. By using TFTs of different sizes, it is possible to vary parasitic capacitance Cgp in the foregoing equation (1) between a scan line and a pixel electrode regarding each pixel.

In the embodiment 1, the fall in the electric potential of the pixel electrode A1 is smaller than the fall in the electric potential of the pixel electrode B1. Therefore, if the parasitic capacitance of the TFT relevant to the pixel electrode B1 is made smaller than the parasitic capacitance of the TFT relevant to the pixel electrode A1, then it is possible to reduce the difference in the electric potential variations between the pixel electrodes A1 and B1. Here, the scan-line selection potential is deemed constant. In addition, the size of the TFT (M1) is deemed greater than the size of the TFT (M3). As a result, an ultimate difference in electric potential variations [delta]$V_P$ between the pixel electrodes A1 and B1 is reduced and set almost the same. The embodiment can thereby secure uniformity of a screen. Note that the sizes of the TFTs can be set up by use of experimental values or simulation values.

Alternatively, the ultimate difference in the electric potential variations [delta]$V_P$ can be reduced by adjusting a size of the TFT (M2). Such a mode corresponds to adjustment of the electric potential difference [delta]$V_{P2}$ in accordance with the size of the TFT (M2) as described in the embodiment 1. A similar effect can be also achieved by adding an additional capacitor to the pixel A. The additional capacitor is formed between the pixel electrode A1 and the scan line Gn+1 or Gn+2 to be used upon selection of the pixel A. The additional capacitor will be further described in the embodiment 4.

Note that the technologies described in the embodiments 1 and 2 can be used in combination. Moreover, if necessary, it is also possible to combine an influence to the electric potential variation by varying the sizes of the TFTs and an influence to the electric potential variation by using different scan-line potential values so as to reciprocate each other. Such modes are also applicable to the following embodiments.

Embodiment 3

A pixel circuit structure of this embodiment is similar to that of the embodiment 1 (see FIG. 2). In the above-described embodiment 1, the difference in the electric potential variations between the pixel electrodes A1 (A) and B1 (B) is compensated by varying the scan-line electric potential at the TFTs. The embodiment 1 compensates for the difference in the electric potential variations between two pixel electrodes by varying scan-line potential values of the scan lines to be used for selection of the pixels. On the contrary, the embodiment 3 aims at compensation for the difference in the electric potential variations between the pixel electrodes A1 (A) and B1 (B) by adopting different values of scan-line potential beside storage capacitors Cs depending on the pixels (the scan-line potential here refers to electric potential of a scan line at a stage precedent to a pixel, which is not used for selection of the relevant pixel).

Before explaining this embodiment, description will be made regarding a compensative drive method for pixel potential via a storage capacitor. It is a drive method of compensating for falling in the pixel potential owing to a variation of gate potential of a TFT with a variation of the pixel potential via a storage capacitor. The compensative drive method itself is a publicly-known art.

The drive method has been disclosed in literature such as "Compensative Addressing for Switching Distortion in a-Si TFTLCD" (K. Suzuki, EuroDisplay '87, pp. 107–110). If a storage capacitor Cs is formed between a pixel electrode and a scan line at a precedent stage thereto, then a variation [delta]Vp' of pixel potential incurred by varying the electric potential of the relevant scan line is defined as:

$$\Delta Vp' = \Delta Vg' \cdot Cs/Cpix \qquad (2)$$

Here, Cs is storage capacitance between the scan line at the precedent stage and the pixel electrode, [delta]Vg' is a variation quantity of electric potential of the scan line at the precedent stage, and Cpix is electric capacitance (inclusive of the storage capacitance) of the entire pixel electrode.

The variation in the pixel potential incurred by the electric potential variation of the scan line in connection with pixel selection is expressed by the equation (1). Therefore, the variation of pixel potential can be suppressed by offsetting the equation (1) and the equation (2). In other words, if $$\Delta Vp + \Delta Vp' = 0 \qquad (3)$$

is satisfied, then such correlations derive the following equation (4). Specifically, $$-\Delta Vg'/\Delta Vg = Cgp/Cs \qquad (4)$$

is obtained. If the equation (4) is satisfied, then it is possible to compensate for the variation of the pixel potential [delta]Vp.

Figure 16:
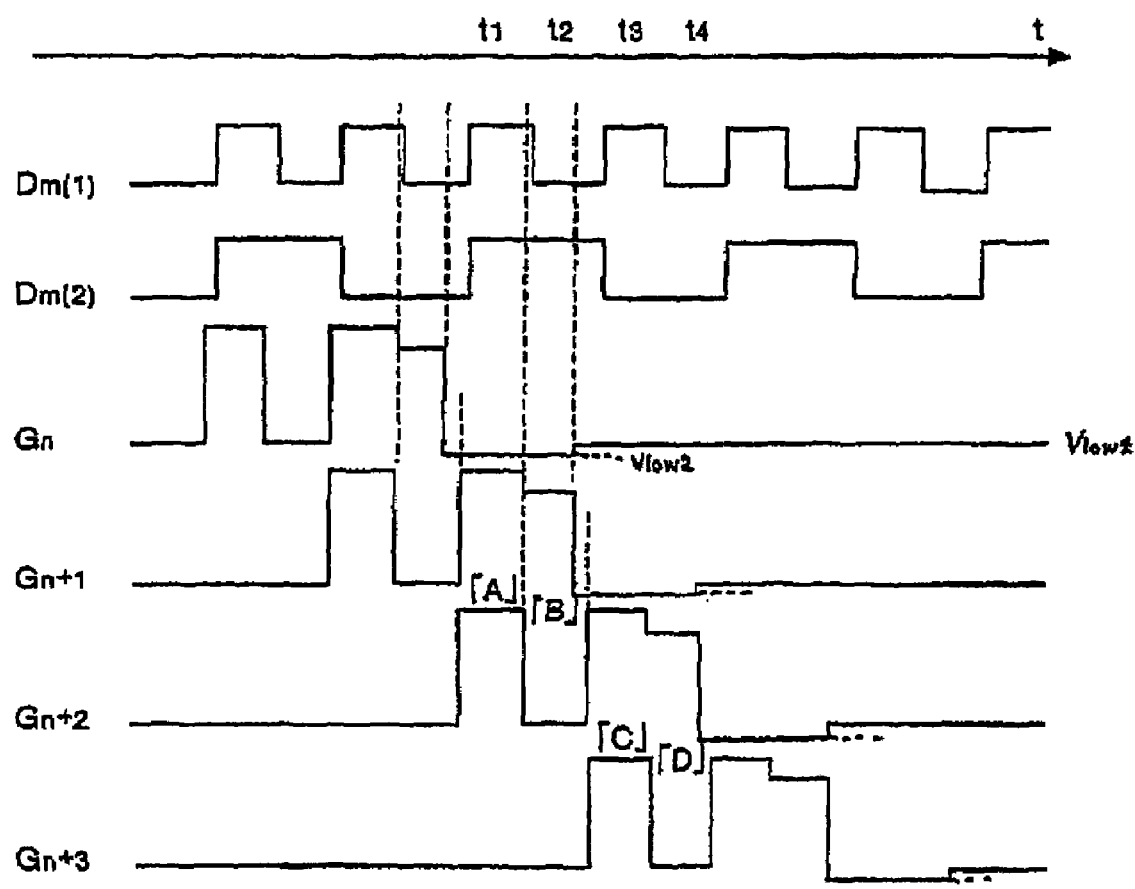
FIG. 16 is a timing chart of scan signals of a liquid crystal display device according to a conventional compensative drive method adopted to the embodiment 1.

FIG. 16 is a timing chart of scan signals in the case where the above-described compensative drive method is adopted to the embodiment 1. A difference between FIG. 16 and FIG. 7 is that electric potential of a scan line in FIG. 16 has two types of low levels. Specifically, each scan-line potential has two non-selection potential values of Vlow1 and Vlow2. After (or simultaneously with) determination of display potential of the pixel electrode, the electric potential of the scan line at the stage precedent to the pixel electrode rises from Vlow2 to Vlow1. Such a difference in the two electric potential values corresponds to [delta]Vg' in the equation (2). In this way, a compensative voltage is given to the pixel electrode by generating the electric potential variation [delta]Vg' on the scan line at the precedent state, which is capacitively coupled with the pixel electrode via the storage capacitor Cs.

However, the conventional compensative drive method provides the same quantity of the compensative voltage to every pixel electrode. Therefore, as described in the embodiment 1, the conventional method cannot deal with the case where the pixel electrodes A and B have different variations of pixel potential. For this reason, a difference occurs between effective voltage values applied to liquid crystal, the values which are controlled by the pixel electrodes A and B, even under a driving condition where the equation (4) is satisfied, thereby resultantly causing luminance unevenness or display defects on a display screen.

Accordingly, as described in the embodiment 1, the scan-line selection potential Vgha upon giving specific display potential to the pixel electrode A1 and the scan-line selection potential Vghb upon giving specific display potential to the pixel electrode B1 must be set to mutually different values.

In the embodiment 3, different compensative voltages are given to the respective pixels as the compensative voltages to be provided by use of the storage capacitors. In this way, the embodiment 3 aims at substantially equalizing electric potential values of the pixel electrodes A and B ultimately after timing t2. Display potential values with respect to the pixel electrodes A and B are assumed to be of the same polarity and the same level. Unlike the embodiment 1, the scan-line potential values for selecting the pixel electrodes are assumed to be the same with respect to each pixel. Moreover, Cs and Cpix of each pixel is assumed to be the same.

Figure 17:
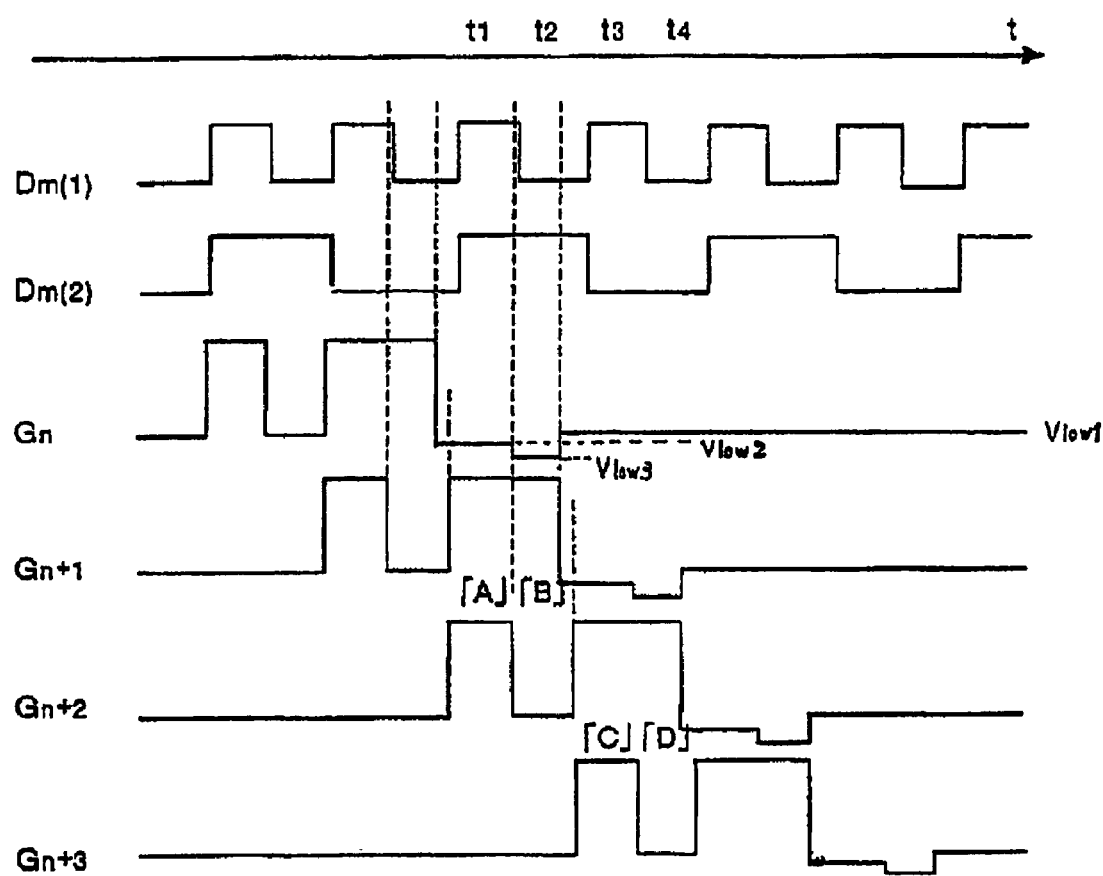
FIG. 17 is a timing chart of scan signals of a liquid crystal display according to the embodiment 3.

FIG. 17 is a timing chart of scanning potential and display potential in this embodiment. The scanning potential has one high level; meanwhile, the scanning potential has three types of low levels. Vlow3 is the lowest electric potential value of the three levels. Vlow2 is the second lowest electric potential, and Vlow1 is the highest non-selection electric potential.

Now, a variation of the scanning potential of the scan line Gn is focused. At timing t1, scanning potential of the scan line Gn is Vlow2. At timing t2, the scanning potential of the scan line Gn is Vlow3. At timing t3, the scanning potential of the scan line Gn is Vlow1. Pixel potential of the pixel electrode A1 falls by (Vlow2−Vlow3) Cs/Cpix via a storage capacitor, owing to a fall in the scanning potential of the scan line Gn from Vlow2 to Vlow3. Thereafter, the pixel potential of the pixel electrode A1 rises by (Vlow1−Vlow3) Cs/Cpix via the storage capacitor owing to a rise in the scanning potential of the scan line Gn from Vlow3 to Vlow1. As a result, the electric potential of the pixel electrode A1 is raised by (Vlow1−Vlow2) Cs/Cpix.

After the display potential of the pixel electrode B1 is determined, the scanning potential of the scan line Gn rises from Vlow3 to Vlow1. Therefore, the electric potential of the pixel electrode B1 is raised by (Vlow1−Vlow3) Cs/Cpix.

According to the description of the embodiment 1, concerning the fall in the pixel potential of the pixel electrode owing to the variation of the scanning potential used for pixel selection, the pixel electrode A1 has a smaller value than a relevant value of the pixel electrode B1. In this embodiment, concerning the rise in the pixel potential owing to the compensative drive via the storage capacitor, the pixel electrode A1 has a smaller value than a relevant value of the pixel electrode B1. Therefore, it is possible to reduce a difference of the variation of the pixel potential between the pixels, with the compensative drive via the storage capacitors by means of selecting Vlow1, Vlow2 and Vlow3 appropriately. The three types of the low scanning potential levels are set up so as to satisfy the following correlations of:

$$(Vlow1-Vlow2)Cs/Cpix = -\Delta V_{PA} = -(\Delta Vp1 + \Delta Vp2);$$
and
$$(Vlow1-Vlow3)Cs/Cpix = -\Delta V_{PB} = -\Delta VP3$$

In this way, both factors of: the fall in the pixel potential of the pixel electrode owing to the variation of the scanning potential used for pixel selection; and the difference in the variations of pixel potential between the multiplex pixels, can be compensated. Whereas the embodiment 1 can reduce the difference in the variations of the pixel potential between the pixels, the embodiment 1 cannot compensate for the fall in the pixel potential. According to this embodiment, these two factors can be compensated simultaneously.

It should be noted that the scan-line potential values are not always limited to values appropriate to the foregoing equations. It is important to reduce the difference in the variations of the pixel potential between the pixels by appropriately selecting optimum values for each display device.

The above-described embodiment achieves compensation for the variation of the pixel potential by means of varying the electric potential of the scan line Gn. The variation of the pixel potential owing to the compensative drive via the storage capacitor is determined by the variation quantity of the scan line potential and the storage capacitor. Therefore, the difference in the electric potential variation between the pixel electrodes can be suppressed by setting different sizes of the storage capacitors depending on the pixels. In the above-described example, a storage capacitor CsA between the pixel electrode A and the scan line Gn is formed smaller than a storage capacitor CsB between the pixel electrode B and the scan line Gn. In this way, the variation of the pixel potential can be compensated while using the same scan-line potential. If the compensative drive via the storage capacitor is not used, then the difference in the variations of the pixel potential between the pixels can be compensated by forming the storage capacitor CsA smaller than the storage capacitor CsB. This is due to the fact that the entire capacitance (Cpix) of the pixel electrode A is smaller than the entire capacitance of the pixel electrode B according to the embodiment 1.

Embodiment 4

The following embodiment 4 has the same pixel circuit structure as that of the liquid crystal display device according to the embodiment 1, except that a mode of connection between a first TFT (M11) and a second TFT (M12) relevant to a pixel electrode A11 is different.

Figure 18:
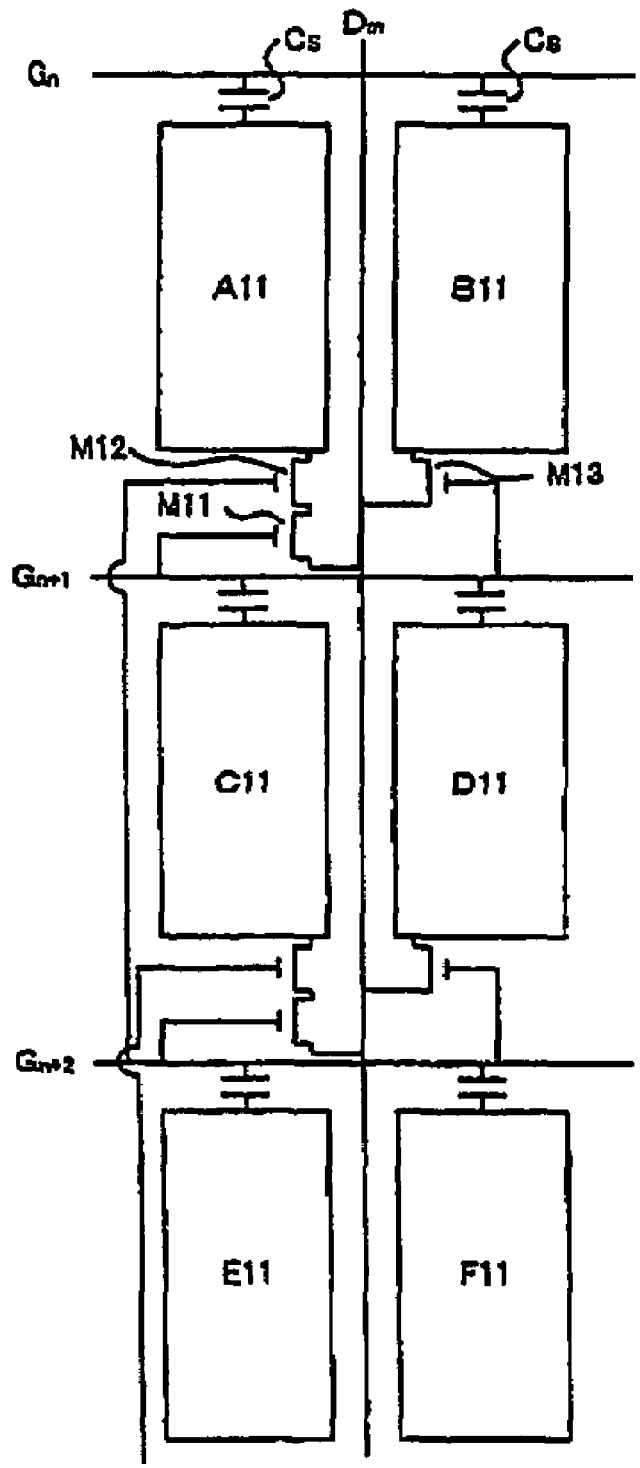
FIG. 18 is a view showing a circuit constitution of an array substrate of a liquid crystal display device according to the embodiment 4.

FIG. 18 is a view showing a circuit configuration of an array substrate of this embodiment. In FIG. 18, three TFTs of a first TFT (M11), a second TFT (M12) and a third TFT (M13) are disposed as described below with respect to pixel electrodes A11 and B11, which are adjacent to each other while sandwiching a signal line Dm. To begin with, a source/drain electrode of the first TFT (M11) is connected to the signal line Dm, and the other source/drain electrode thereof is connected to a source/drain electrode of the second TFT (M12). A gate electrode of the first TFT (M11) is connected to a scan line Gn+1.

A source/drain electrode of the second TFT (M12) is connected to the first TFT (M11), and the other source/drain electrode thereof is connected to the pixel electrode A11. A gate electrode of the second TFT (M12) is connected to a scan line Gn+2. Therefore, the first TFT (M11) and the second TFT (M12) are set to on-state only in a period when the two adjacent scan lines Gn+1 and Gn+2 are simultaneously set to the selection potential, whereby electric potential of the signal line Dm is supplied to the pixel electrode A11. In other words, the first TFT (M11) and the second TFT (M12) are provided on a path to supply data potential to the pixel electrode A11, and the gate electrode of the first TFT (M11) and the gate electrode of the second TFT (M12) are turned on when the two scan lines Gn+1 and Gn+2 located at subsequent stages to the pixel electrode A11 are set to the selection potential. When the gate electrode of the first TFT (M11) and the gate electrode of the second TFT (M12) are turned on, the data potential is supplied from the signal line Dm to the pixel electrode A11.

A source/drain electrode of the third TFT (M13) is connected to the signal line Dm, and the other source/drain electrode thereof is connected to the pixel electrode B11. A gate electrode of the third TFT (M13) is connected to the scan line Gn+1. Therefore, the third TFT (M13) is turned on when the scan line Gn+1 is set to the selection potential, whereby the electric potential of the signal line Dm is supplied to the pixel electrode B11.

Figure 19:
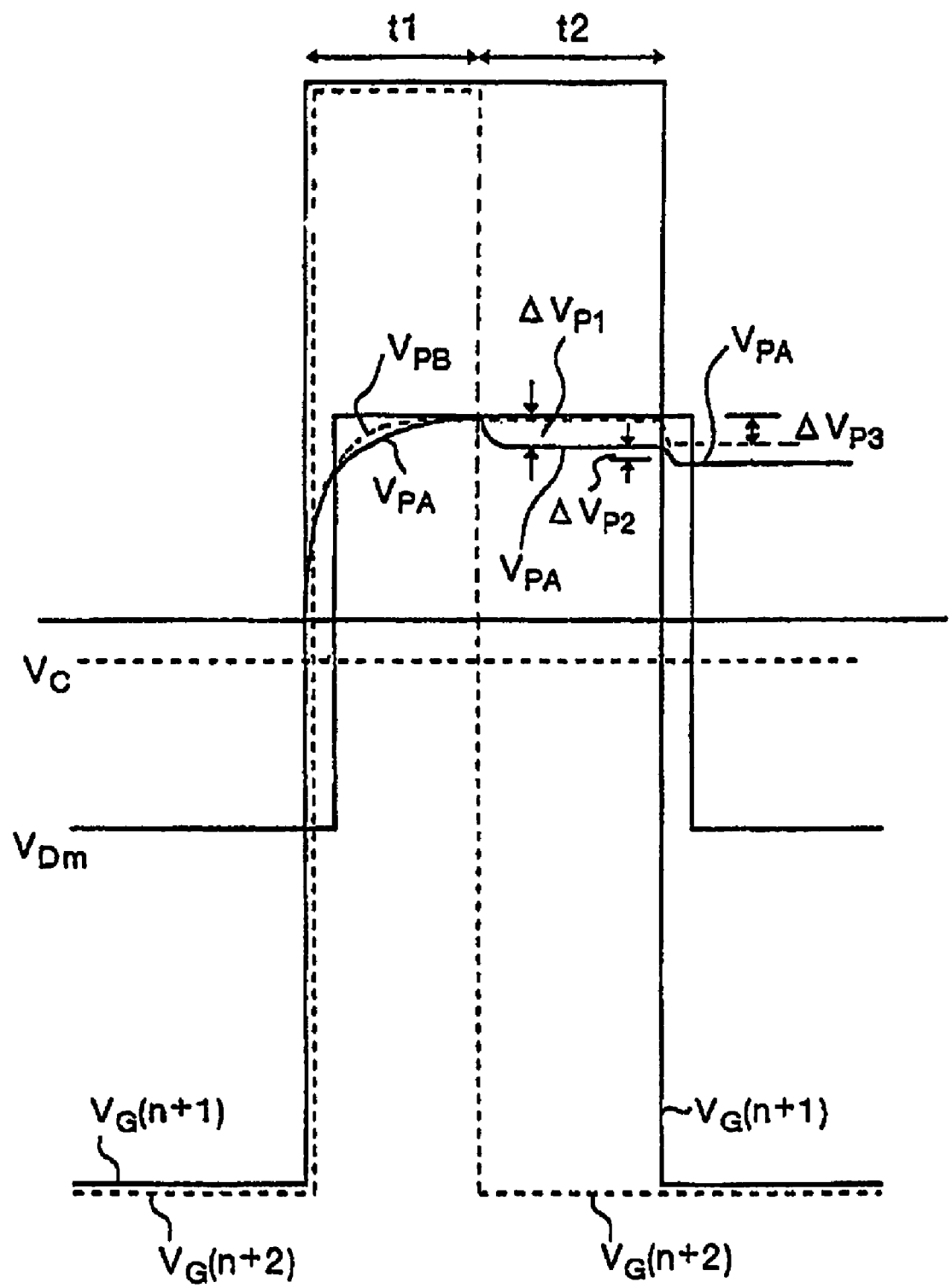
FIG. 19 is a graph showing drive pulses and voltage variations in the vicinity of pixel electrodes of a conventional liquid crystal display device provided with an array circuit structure of the embodiment 4.

FIG. 19 is a timing chart showing variations of scan-line potential and pixel potential in a conventional display device including the pixel electrode structure of the embodiment. Since the reference codes in the drawing are similar to those in FIG. 8, description thereto will be omitted herein.

Electric potential $V_{PA}$ of the pixel electrode A11 is set to almost the same value as electric potential $V_{Dm}$ at the end of timing t1. Moreover, electric potential $V_{PB}$ of the pixel electrode B11 is set to almost the same value as the electric potential $V_{Dm}$ as well.

However, an electric potential variation associated with turning on-and-off of the TFTs occurs after the timing t1, whereby the electric potential $V_{PA}$ of the pixel electrode A11 falls by $[delta]V_{P1}$. A fall in the electric potential $V_G(n+2)$ of the scan line Gn+2 (in an interval between the timing t1 and timing t2) causes the fall in the electric potential $V_{PA}$ of the pixel electrode A11 as equivalent to $[delta]V_{P1}$ via parasitic capacitance between the scan line Gn+2 and the pixel electrode A11. The parasitic capacitance between the scan line Gn+2 and the pixel electrode A11 is mainly attributable to parasitic capacitance between the gate electrode of the TFT (M12) and the pixel electrode A11.

Furthermore, a fall in electric potential $V_G(n+1)$ of the scan line Gn+1 (in an interval between the timing t2 and timing t3) causes a fall in the electric potential $V_{PA}$ as equivalent to $[delta]V_{P2}$ via parasitic capacitance between the scan line Gn+1 and the pixel electrode A11. The parasitic capacitance between the scan line Gn+1 and the pixel electrode A11 is mainly attributable to capacitance through the TFT (M11) and the TFT (M12). In this embodiment, the electric potential variation $[delta]V_{P1}$ is greater than the electric potential variation $[delta]V_{P2}$. Such an aspect is attributable to a fact that the parasitic capacitance between the scan line Gn+2 and the pixel electrode A11 is greater than the parasitic capacitance between the scan line Gn+1 and the pixel electrode A11. Such an aspect is attributable to reasons such as: that the $[delta]V_{P2}$ depends on the parasitic capacitance through the two TFTs; and that the parasitic capacitance of the TFT (M12) is equal to capacitance between the source and the drain thereof.

The electric potential $V_{PB}$ of the pixel electrode B11 is set to almost the same value as the electric potential $V_{Dm}$ at the end of the timing t2. However, an electric potential variation associated with turning on-and-off of the TFTs occurs after the timing t2, whereby the electric potential VPB of the pixel electrode B11 falls by $[delta]V_{P3}$. A fall in the electric potential $V_G(n+1)$ of the scan line Gn+1 (in the interval between the timing t2 and the timing t3) causes the fall in the electric potential $V_{PB}$ of the pixel electrode B11 as equivalent to $[delta]V_{P3}$ via parasitic capacitance between the scan line Gn+1 and the pixel electrode B11. The parasitic capacitance between the scan line Gn+1 and the pixel electrode B11 is mainly attributable to parasitic capacitance between the gate electrode of the TFT (M13) and the pixel electrode B11.

What is important here is a fact that the electric potential variations associated with turning on-and-off of the TFTs upon pixel selection show different degrees between the electric potential $V_{PA}$ of the pixel electrode A11 and the electric potential $V_{PB}$ of the pixel electrode B11. In this embodiment, the electric potential variation $[delta]V_{P3}$ of the pixel electrode B11 is smaller than the electric potential variation $([delta]V_{P1}+[delta]V_{P2})$ of the pixel electrode A11. The three TFTs in this embodiment have the same size. It is generally preferred that characteristics of the TFTs for transmitting display signals are designed equal. The parasitic capacitance between the TFT (M13) and the pixel electrode B11 is equal to the parasitic capacitance between the TFT (M12) and the pixel electrode A11. Therefore, if the scan-line potential is constant, the electric potential variation $[delta]V_{P3}$ and the electric potential variation $[delta]V_{P1}$ become mutually equal. Hence, the electric potential variation (the fall in the electric potential) of the pixel electrode A11 is greater than the electric potential variation of the pixel electrode B11 by the electric potential variation $[delta]V_{P2}$.

It is possible to compensate for the difference in the electric potential variations by adopting the technologies as described in the embodiments 1 to 3.

According to the embodiment 1, Vgha is set to a value smaller than Vghb. In this way, $[delta]V_{P1}$ becomes smaller than $[delta]V_{P3}$, whereby the difference in the electric potential variations between the two pixel electrodes is reduced. If $([delta]V_{P1}+[delta]V_{P2})$ is set to almost the same value as $[delta]V_{P3}$, then it is possible to set the electric potential variations of the two pixel electrodes almost to the same value.

Otherwise, according to the embodiment 2, the TFT (M13) and the TFT (M12) are formed in different sizes. The size of $[delta]V_{P3}$ can be designed greater than the size of the $[delta]V_{P1}$, by designing the TFT (M13) greater than the TFT (M12).

Figure 20:
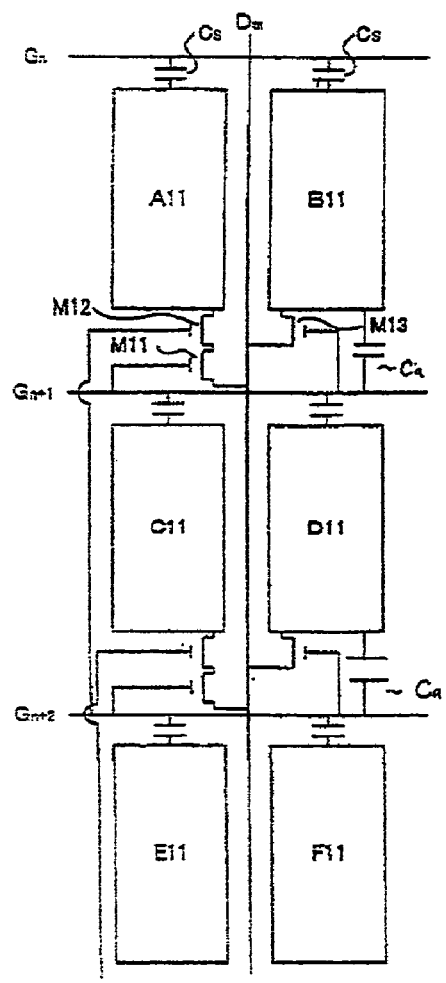
FIG. 20 is a view showing an array circuit structure including additional capacitors.
Figure 21:
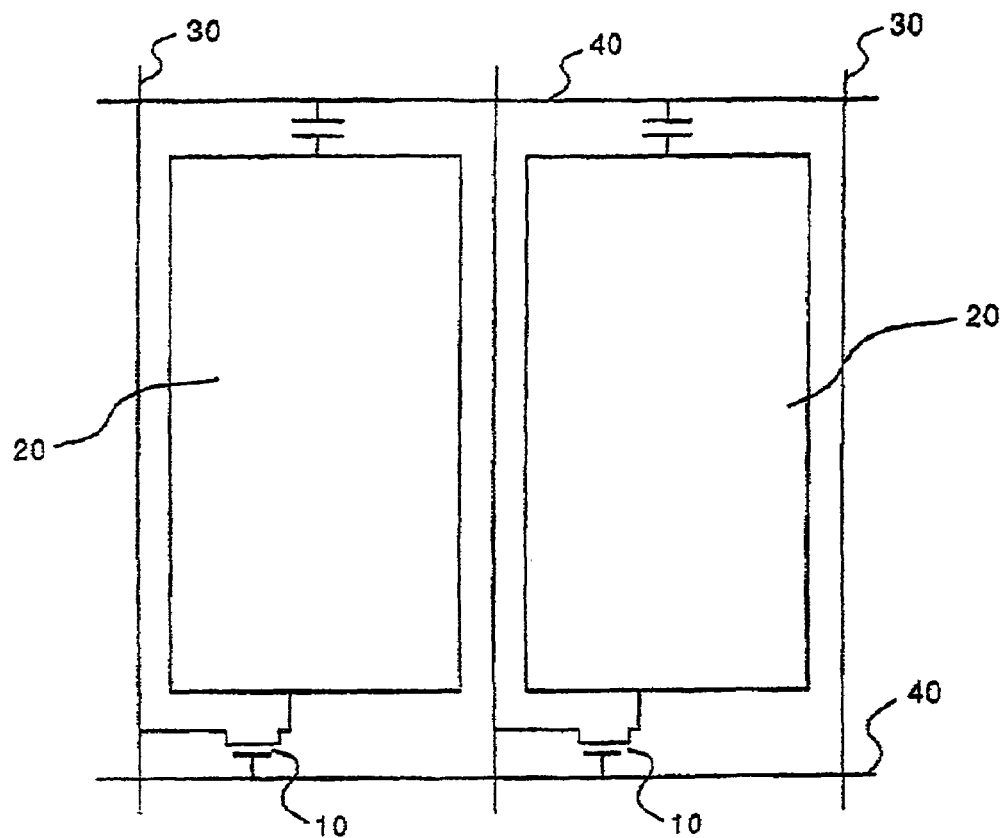
FIG. 21 is an equivalent circuit diagram of a conventional TFT array substrate.
Figure 22:
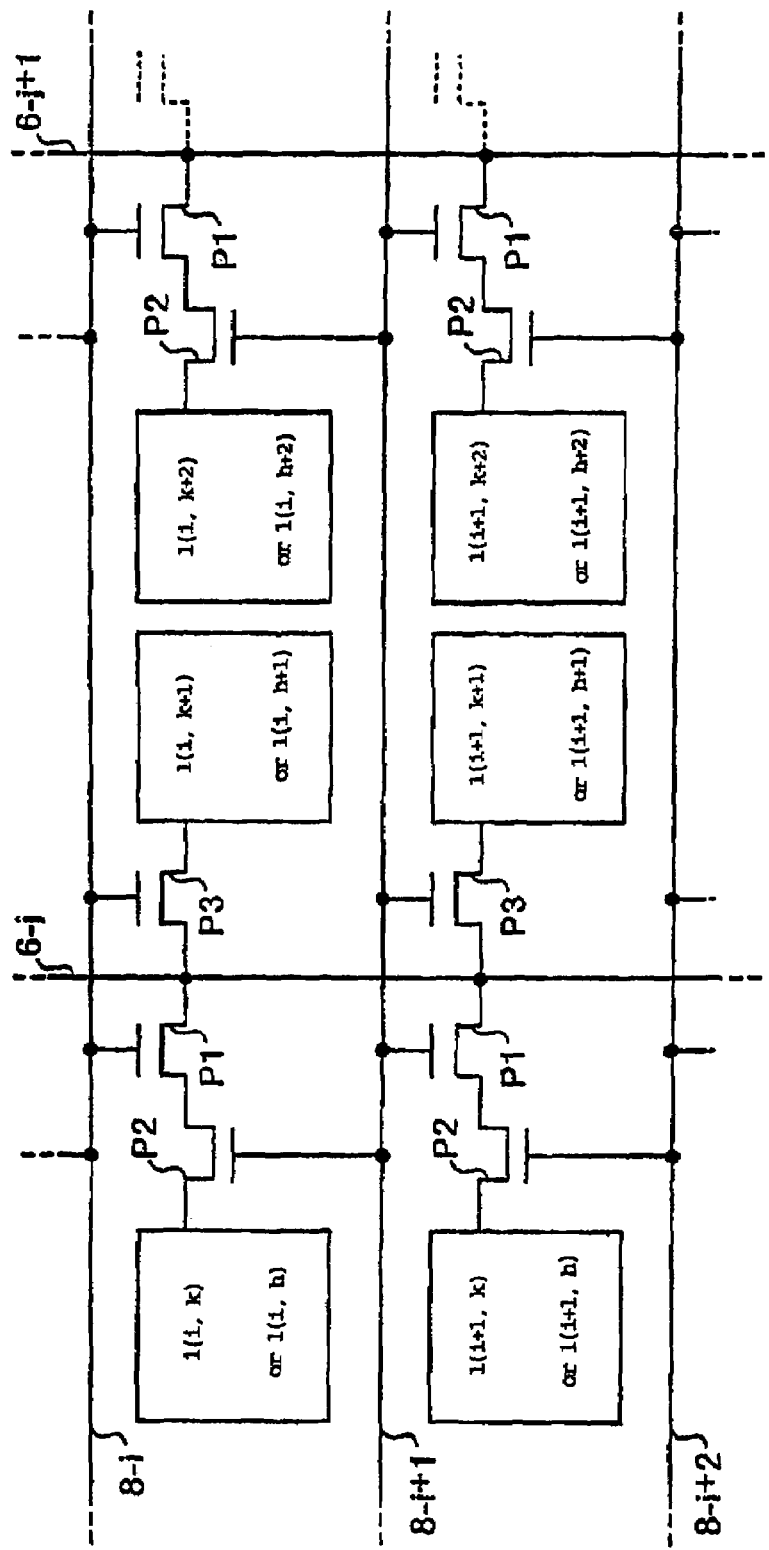
FIG. 22 is a view showing a circuit constitution of an array substrate disclosed in Japanese Unexamined Patent Publication No. 5(1993)-265045.

The difference in the electric potential variations can be compensated by adding a capacitor between the pixel electrode and the scan line used for selection. The variation of the pixel potential of the pixel electrode B11 can be increased by adding the additional capacitor to the pixel B. The additional capacitor is formed between the pixel electrode B11 and the scan line Gn+1 which is used for selection of the pixel B. FIG. 20 illustrates the additional capacitor (Ca) formed between the pixel electrode B11 and the scan line Gn+1, and an additional capacitor (Ca) formed between a pixel electrode D11 and the scan line Gn+2.

The additional capacitor can be formed by means of extending the pixel electrode onto the scan line Gn+1. Alternatively, the additional capacitor can be also formed by forming an additional conductor overlapping the scan line Gn+1 in the course of forming a signal line layer and by connecting the additional conductor to the pixel electrode B11.

For example, a TN-type LCD with a bottom-gate TFT structure includes a scan line layer as a lower layer and a pixel electrode layer as an upper layer. Here, a pixel electrode structure of the LCD is assumed to include a signal line layer (a source/drain layer) between the scan line layer and the pixel electrode layer. An insulating layer such as a gate insulating layer is formed on the scan line layer. By extending a pixel electrode onto a scan line, it is possible to form a capacitor composed of the pixel electrode, the scan line and the insulating layer. Alternatively, a conductor portion overlapping the scan line via the insulating layer, is formed with the signal line layer, and then the conductor potion is connected to the pixel electrode. The additional capacitor composed of the pixel electrode, the conductor portion of the signal line layer, the insulating layer and the scan line can be thereby formed.

Upon formation of the additional capacitor, an appropriate structure should be selected according to the pixel structure without limitations to the above-described structures. What is important here is that the capacitor is added between the pixel electrode and the scan line which is used for selection of the pixel. In terms of a storage capacitor, in an LCD including a storage capacitor formed with a scan line and a pixel electrode, the storage capacitor is formed between a pixel electrode and a scan line which is not used for selection of the pixel.

The difference in the electric potential variations in this embodiment can be compensated by use of the technology described in the embodiment 3. The Vlow2 value in the embodiment 3 is set to a value lower than the Vlow3 therein. Vlow2 is the lowest non-selection potential and Vlow1 is the highest non-selection potential. Meanwhile, Vlow3 is a value between Vlow1 and Vlow2.

A rise in the pixel potential of the pixel electrode A11 is determined based on (Vlow1−Vlow2), and a rise in the pixel potential of the pixel electrode B11 is determined based on (Vlow1−Vlow3). In this embodiment, a fall in the electric potential ([delta]$V_{P1}$+[delta]$V_{P2}$) of the pixel electrode A11 is greater than a fall in the electric potential ([delta]$V_{P3}$) of the pixel electrode B11. Since (Vlow1−Vlow2) is greater than (Vlow1−Vlow3), by setting three appropriate non-selection potential values, it is possible to reduce the difference in the variations of the pixel potential between the pixel electrodes A11 and B11 and to substantially equalize two variation quantities of the electric potential.

Moreover, it is possible to compensate for the variations of the pixel potential by setting the sizes of the storage capacitors to different values with respect to the pixel A and the pixel B. As described in the embodiment 3, the compensative voltage via the storage capacitor depends on the size of the storage capacitor and the variation quantity of the electric potential of the scan line. Designing the storage capacitor of the pixel electrode A larger than the storage capacitor of the pixel electrode B effectuates reduction of the difference in the variations of the pixel potential.

Although the present invention has been described above regarding a liquid crystal display device of a twisted nematic (TN) type, the present invention is also applicable to various types of display devices such as a liquid crystal display device of an in-plane switching (IPS) type. Moreover, application of the present invention is not only limited to a display device of a duplex type in which two pixels are multiplexed, but the present invention is also applicable to multiplex display devices of triplex and higher multiplex types.

As described above, according to this invention, the number of signal lines, therefore, the number of data drivers can be reduced. Accordingly, enhancement in higher resolution can be achieved and a difference in electric potential variations among pixel electrodes attributable to parasitic capacitance between a pixel electrode and a selection scan line can be compensated. As the difference in the electric potential variations is reduced, it is possible to enhance uniformity of a display screen.

Although the preferred embodiments of the present invention have been described in detail, it should be understood that various changes, substitutions and alternations can be made therein without departing from spirit and scope of the inventions as defined by the appended claims.

What is claimed is:

1. A display device comprising:
a signal line for transmitting display signals for image display to a plurality of pixel electrodes; and
first and second pixel electrodes to which the display signals are severally and serially given by the signal line within one scanning cycle,
wherein the first pixel electrode is connected to a first scan line group, which includes at least one scan line, via a first thin-film transistor circuit,
the second pixel electrode is connected to a second scan line group, which includes at least one scan line, via a second thin-film transistor circuit which is different from the first thin-film transistor circuit,
a driver circuit outputs a first scan signal to the first scan line group when a first display signal is given to the first pixel electrode,
the driver circuit outputs a second scan signal to the second scan line group when a second display signal is given to the second pixel electrode, and
the first scan signal and the second scan signal have electric potential values different from each other.

2. The display device according to claim 1,
wherein the first thin-film transistor circuit includes a first thin-film transistor of which a source/drain electrode is connected to the first pixel electrode, and a second thin-film transistor of which a source/drain electrode is connected to a gate electrode of the first thin-film transistor of the first pixel electrode,
the second thin-film transistor circuit includes a third thin-film transistor of which a source/drain electrode is connected to the second pixel electrode and of which a gate electrode is connected to a second scan line included in the second scan line group,
first scan-line potential outputted to a first scan line included in the first scan line group is given to the gate electrode of the first thin-film transistor via the second thin-film transistor when the first scan signal is outputted,
second scan-line potential is outputted to the second scan line when the second scan signal is outputted, and
the outputted first scan-line potential has a greater value than the outputted second scan-line potential.

3. The display device according to claim 2,
wherein another source/drain electrode of the first thin-film transistor is connected to the signal line,
another source/drain electrode of the second thin-film transistor is connected to the first scan line and a gate electrode of the second thin-film transistor is connected to another scan line included in the first scan line group, and
another source/drain electrode of the third thin-film transistor is connected to the signal line.

4. The display device according to claim 1,
wherein the first thin-film transistor circuit includes a first thin-film transistor of which a source/drain electrode is connected to the first pixel electrode and of which a gate electrode is connected to a first scan line included in the first scan line group,
the second thin-film transistor circuit includes a second thin-film transistor of which a source/drain electrode is connected to the second pixel electrode and of which a gate electrode is connected to a second scan line included in the second scan line group,
a display signal is given to the second pixel electrode after a display signal is given to the first pixel electrode, and
scan-line potential outputted to the first scan line has a smaller value than scan-line potential outputted to the second scan line.

5. The display device according to claim 1,
wherein the first scan signal and the second scan signal have electric potential values different from each other to reduce a difference between a variation quantity of pixel potential possessed by the first pixel electrode and a variation quantity of pixel potential possessed by the second pixel electrode, the difference being attributable to variations of scan-line potential.

6. The display device according to claim 4,
wherein the first thin-film transistor circuit further includes a third thin-film transistor,
source/drain electrodes of the third thin-film transistor are severally connected to the signal line and a source/drain electrode of the first thin-film transistor,
a gate electrode of the third thin-film transistor is connected to a third scan line included in the first scan line group, and
the second scan line and the third scan line collectively constitute a common scan line.

7. The display device according to claim 1,
wherein the first thin-film transistor circuit includes first and second thin-film transistors,
the second thin-film transistor circuit includes a third thin-film transistor,
the first scan line group consists of first and second scan lines,
the second scan line group consists of the second scan line,
a display signal is given to the first pixel electrode when the first and the second scan lines are selected, and
a display signal is given to the second pixel electrode when the first scan line is not selected and the second scan line is selected.

8. A display device comprising:
a signal line for transmitting display signals for image display to a plurality of pixel electrodes; and
first and second pixel electrodes to which the display signals are severally and serially given by the signal line within one scanning cycle,
wherein the first pixel electrode is connected to a first scan line group, which includes at least one scan line, via a first thin-film transistor circuit,
the second pixel electrode is connected to a second scan line group, which includes at least one scan line, via a second thin-film transistor circuit which is different from the first thin-film transistor circuit,
a driver circuit outputs a first scan signal to the first scan line group when a first display signal is given to the first pixel electrode,
the driver circuit outputs a second scan signal to the second scan line group when a second display signal is given to the second pixel electrode, and
a size of at least one thin-film transistor included in the first thin-film transistor circuit is different from a size of at least one thin-film transistor included in the second thin-film transistor circuit.

9. The display device according to claim 8,
wherein the first thin-film transistor circuit includes a first thin-film transistor of which a source/drain electrode is connected to the first pixel electrode, and a second thin-film transistor of which a source/drain electrode is connected to a gate electrode of the first thin-film transistor,
the second thin-film transistor circuit includes a third thin-film transistor of which a source/drain electrode is connected to the second pixel electrode and of which a gate electrode is connected to a second scan line included in the second scan line group,
first scan-line potential outputted to a first scan line included in the first scan line group is given to the gate electrode of the first thin-film transistor via the second thin-film transistor when the first scan signal is outputted,
second scan-line potential is outputted to the second scan line when the second scan signal is outputted, and
the first thin-film transistor is greater than the third thin-film transistor.

10. The display device according to claim 9,
wherein the second thin-film transistor is smaller than the third thin-film transistor.

11. The display device according to claim 8,
wherein at least one thin-film transistor included in the first thin-film transistor circuit has a different size from a size of at least one thin-film transistor included in the second thin-film transistor circuit, to reduce a difference between a variation quantity of pixel potential possessed by the first pixel electrode and a variation quantity of pixel potential possessed by the second pixel electrode, the difference being attributable to variations of scan line potential.

12. The display device according to claim 8,
wherein the first thin-film transistor circuit includes a first thin-film transistor of which a source/drain electrode is connected to the first pixel electrode and of which a gate electrode is connected to a first scan line included in the first scan line group,
the second thin-film transistor circuit includes a second thin-film transistor of which a source/drain electrode is connected to the second pixel electrode and of which a gate electrode is connected to a second scan line included in the second scan line group,
the first scan line group and the second scan line group possess a scan line in common and a display signal is given to the second pixel electrode after a display signal is given to the first pixel electrode, and
the second thin-film transistor is greater than the first thin-film transistor.

13. The display device according to claim 8,
wherein the first thin-film transistor circuit includes a first thin-film transistor connected to the first pixel electrode, and a second thin-film transistor connected to the first thin-film transistor,
the second thin-film transistor circuit includes a third thin-film transistor,
the first scan line group consists of first and second scan lines,
the second scan line group consists of the second scan line,
a display signal is given to the first pixel electrode when the first and the second scan lines are selected,
a display signal is given to the second pixel electrode when the first scan line is not selected and the second scan line is selected, and
the third thin-film transistor is greater than the first thin-film transistor.

14. A display device comprising:
a signal line for transmitting display signals for image display to a plurality of pixel electrodes; and
first and second pixel electrodes to which the display signals are severally and serially given by the signal line within one scanning cycle,
wherein the first pixel electrode is connected to a first scan line group, which includes at least one scan line, via a first thin-film transistor circuit,
the second pixel electrode is connected to a second scan line group, which includes at least one scan line, via a second thin-film transistor circuit which is different from the first thin-film transistor circuit,
a driver circuit outputs a first scan signal to the first scan line group when a first display signal is given to the first pixel electrode,
the driver circuit outputs a second scan signal to the second scan line group when a second display signal is given to the second pixel electrode, and
an additional capacitor is formed between the first pixel electrode and a scan line included in the first scan line group, the additional capacitor being not formed between the second pixel electrode and scan lines included in the second scan line group.

15. The display device according to claim 14,
wherein the first thin-film transistor circuit includes a first thin-film transistor of which a source/drain electrode is connected to the first pixel electrode, and a second thin-film transistor of which a source/drain electrode is connected to a gate electrode of the first thin-film transistor, the second thin-film transistor circuit includes a third thin-film transistor of which a source/drain electrode is connected to the second pixel electrode and of which a gate electrode is connected to a second scan line included in the second scan line group, first scan-line potential outputted to a first scan line included in the first scan line group is given to the gate electrode of the first thin-film transistor via the second thin-film transistor when the first scan signal is outputted, and second scan-line potential is outputted to the second scan line when the second scan signal is outputted.

16. The display device according to claim 14,
wherein the additional capacitor is formed between the first pixel electrode and the scan line included in the first scan line group, to reduce a difference between a variation quantity of pixel potential possessed by the first pixel electrode and a variation quantity of pixel potential possessed by the second pixel electrode, the difference being attributable to variations of scan line potential.

17. The display device according to claim 14,
wherein the first thin-film transistor circuit includes a first thin-film transistor of which a source/drain electrode is connected to the first pixel electrode and of which a gate electrode is connected to a first scan line included in the first scan line group, the second thin-film transistor circuit includes a second thin-film transistor of which a source/drain electrode is connected to the second pixel electrode and of which a gate electrode is connected to a second scan line included in the second scan line group, and the first scan line group and the second scan line group possess a scan line in common and a display signal is given to the first pixel electrode after a display signal is given to the second pixel electrode.

18. The display device according to claim 14,
wherein the additional capacitor is formed in a manner that any of part of the first pixel electrode and a conductive portion connected to the first pixel electrode overlaps a scan line via an insulating layer.

19. A display device comprising:
a signal line for transmitting display signals for image display to a plurality of pixel electrodes; and
first and second pixel electrodes to which the display signals are severally and serially given by the signal line within one scanning cycle,
wherein the first pixel electrode is connected to a first scan line group, which includes at least one scan line, via a first thin-film transistor circuit,
the second pixel electrode is connected to a second scan line group, which includes at least one scan line, via a second thin-film transistor circuit which is different from the first thin-film transistor circuit,
a driver circuit outputs a first scan signal to the first scan line group when a first display signal is given to the first pixel electrode,
the driver circuit outputs a second scan signal to the second scan line group when a second display signal is given to the second pixel electrode,
the first pixel electrode functions as an electrode of a first storage capacitor,
the second pixel electrode functions as an electrode of a second storage capacitor, and the first storage capacitor is smaller than the second storage capacitor.

20. A display device comprising:
a signal line for transmitting display signals for image display to a plurality of pixel electrodes; and
first and second pixel electrodes to which the display signals are severally and serially given by the signal line within one scanning cycle,
wherein the first pixel electrode is connected to a first scan line group, which includes at least one scan line, via a first thin-film transistor circuit,
the second pixel electrode is connected to a second scan line group, which includes at least one scan line, via a second thin-film transistor circuit which is different from the first thin-film transistor circuit,
a driver circuit outputs a first scan signal to the first scan line group when a first display signal is given to the first pixel electrode,
the driver circuit outputs a second scan signal to the second scan line group when a second display signal is given to the second pixel electrode,
the first and the second pixel electrodes are formed between an n-th scan line and an n+1-th scan line,
storage capacitors are formed severally between the n-th scan line and the first and the second pixel electrodes,
the first scan line group and the second scan line group are composed of scan lines subsequent to the n-th scan line exclusive of the n-th scan line, and
a value of scan-line potential of the n-th scan line in a first period when display potential is given to the first pixel electrode is different from a value of scan-line potential of the n-th scan line in a second period when display potential is given to the second pixel electrode.

21. The display device according to claim 20,
wherein the first thin-film transistor circuit includes a first thin-film transistor of which a source/drain electrode is connected to the first pixel electrode, and a second thin-film transistor of which a source/drain electrode is connected to a gate electrode of the first thin-film transistor, the second thin-film transistor circuit includes a third thin-film transistor of which a source/drain electrode is connected to the second pixel electrode and of which a gate electrode is connected to a second scan line included in the second scan line group, first scan-line potential outputted to a first scan line included in the first scan line group is given to the gate electrode of the first thin-film transistor via the second thin-film transistor when the first scan signal is outputted, second scan-line potential is outputted to the second scan line when the second scan signal is outputted, and the scan-line potential of the n-th scan line in the first period is greater than the scan-line potential in the second period.

22. The display device according to claim 21,
wherein another source/drain electrode of the first thin-film transistor is connected to the signal line,
another source/drain electrode of the second thin-film transistor is connected to the first scan line and a gate electrode of the second thin-film transistor is connected to another scan line included in the first scan line group, and
another source/drain electrode of the third thin-film transistor is connected to the signal line.

23. The display device according to claim 20,
wherein the scan-line potential of the n-th scan line takes different values between the first period when display potential is given to the first pixel electrode and the second period when display potential is given to the second pixel electrode, to reduce a difference between a variation quantity of pixel potential possessed by the first pixel electrode and a variation quantity of pixel potential possessed by the second pixel electrode, the difference being attributable to variations of scan line potential.

24. The display device according to claim 20,
wherein the first thin-film transistor circuit includes a first thin-film transistor of which a source/drain electrode is connected to the first pixel electrode and of which a gate electrode is connected to a first scan line included in the first scan line group, the second thin-film transistor circuit includes a second thin-film transistor of which a source/drain electrode is connected to the second pixel electrode and of which a gate electrode is connected to a second scan line included in the second scan line group, a display signal is given to the second pixel electrode after a display signal is given to the first pixel electrode, and scan-line potential of the n-th scan line in the first period is smaller than scan-line potential in the second period.

25. The display device according to claim 24,
wherein the first thin-film transistor circuit further includes a third thin-film transistor, source/drain electrodes of the third thin-film transistor are severally connected to the signal line and a source/drain electrode of the first thin-film transistor, a gate electrode of the third thin-film transistor is connected to a third scan line included in the first scan line group, and the second scan line and the third scan line collectively constitute one identical line.

* * * * *